(12) United States Patent
Mitsumoto

(10) Patent No.: US 7,827,569 B2
(45) Date of Patent: Nov. 2, 2010

(54) RECORDING MEDIUM DRIVE SYSTEM AND ELECTRONIC APPARATUS

(75) Inventor: Yoichiro Mitsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 947 days.

(21) Appl. No.: 11/699,411

(22) Filed: Jan. 30, 2007

(65) Prior Publication Data

US 2007/0186223 A1 Aug. 9, 2007

(30) Foreign Application Priority Data

| Feb. 6, 2006 | (JP) | ............................. | 2006-028722 |
| Feb. 6, 2006 | (JP) | ............................. | 2006-028821 |
| Feb. 14, 2006 | (JP) | ............................. | 2006-036232 |
| Feb. 14, 2006 | (JP) | ............................. | 2006-036357 |

(51) Int. Cl.
*G11B 17/04* (2006.01)

(52) U.S. Cl. .................... 720/622; 720/617; 720/619; 720/620; 720/621; 720/641

(58) Field of Classification Search .............. 720/617, 720/619–626, 641, 642
See application file for complete search history.

(56) References Cited

U.S. PATENT DOCUMENTS

| 7,305,685 B2 * | 12/2007 | Rumpf et al. | ............... 720/623 |
| 7,467,395 B2 * | 12/2008 | Omori et al. | ............... 720/622 |
| 2005/0160439 A1 * | 7/2005 | Inoue | ......................... 720/621 |
| 2008/0134224 A1 * | 6/2008 | Wang et al. | ................. 720/620 |

FOREIGN PATENT DOCUMENTS

| JP | 2590967 | 12/1993 |
| JP | 07-049676 | 2/1995 |
| JP | 08-339675 | 12/1996 |
| JP | 2001-056994 | 2/2001 |
| JP | 3670716 | 4/2005 |
| JP | 2005-190645 | 7/2005 |

* cited by examiner

*Primary Examiner*—Joseph H Feild
*Assistant Examiner*—Huy D Nguyen
(74) *Attorney, Agent, or Firm*—Rader, Fishman & Grauer PLLC

(57) ABSTRACT

Disclosed herein is a recording medium drive system including: a casing provided in a front face thereof with a slot through which to insert and discharge a recording medium having a principal surface and an opposite surface; and a sheet-formed member provided so as to close the slot and having a loop-formed deflected part which, while being deformed, is capable of making contact with at least one of the principal surface and the opposite surface of the recording medium at the times of insertion and discharge of the recording medium.

5 Claims, 28 Drawing Sheets

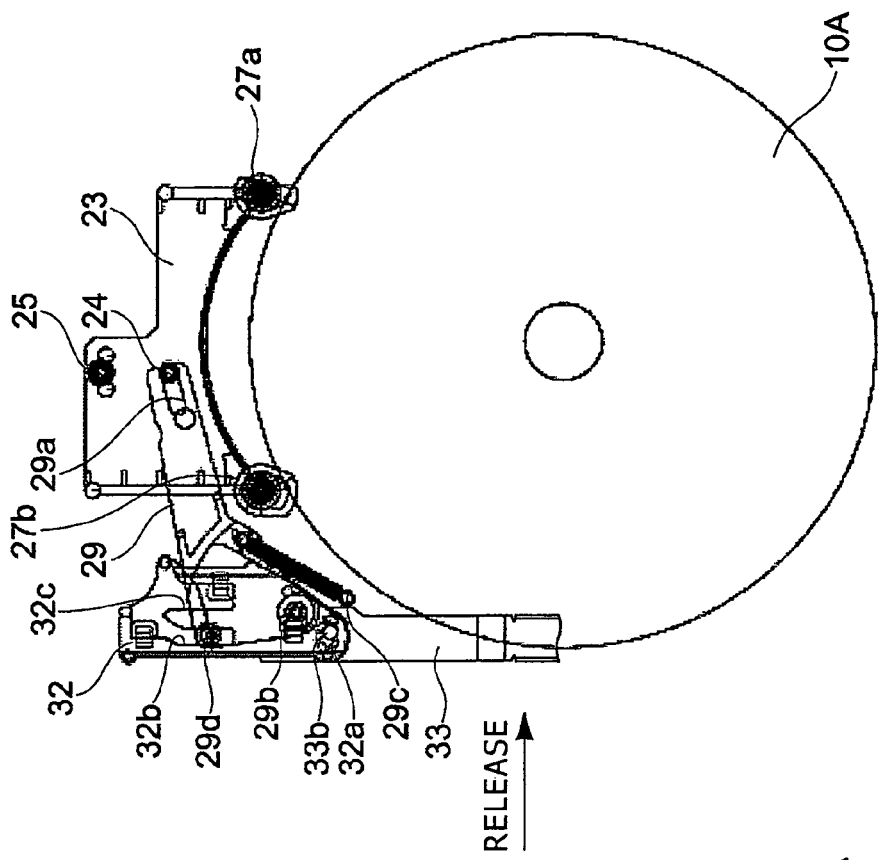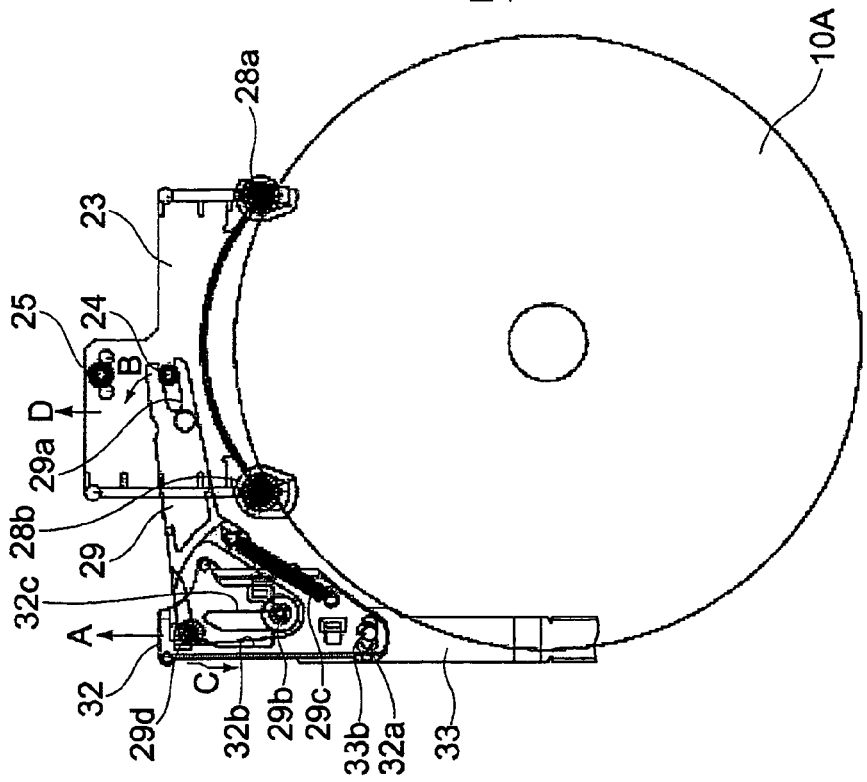

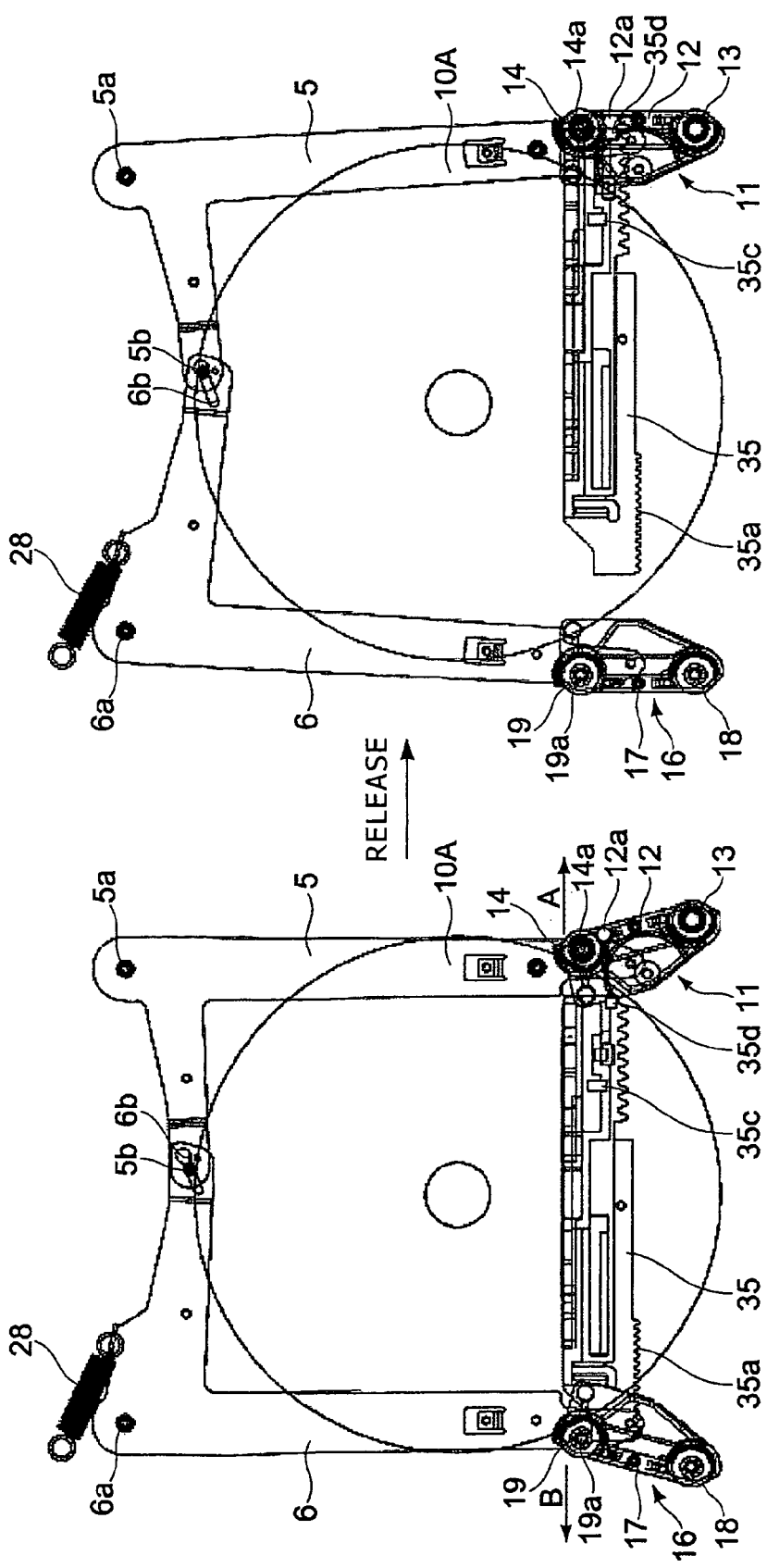

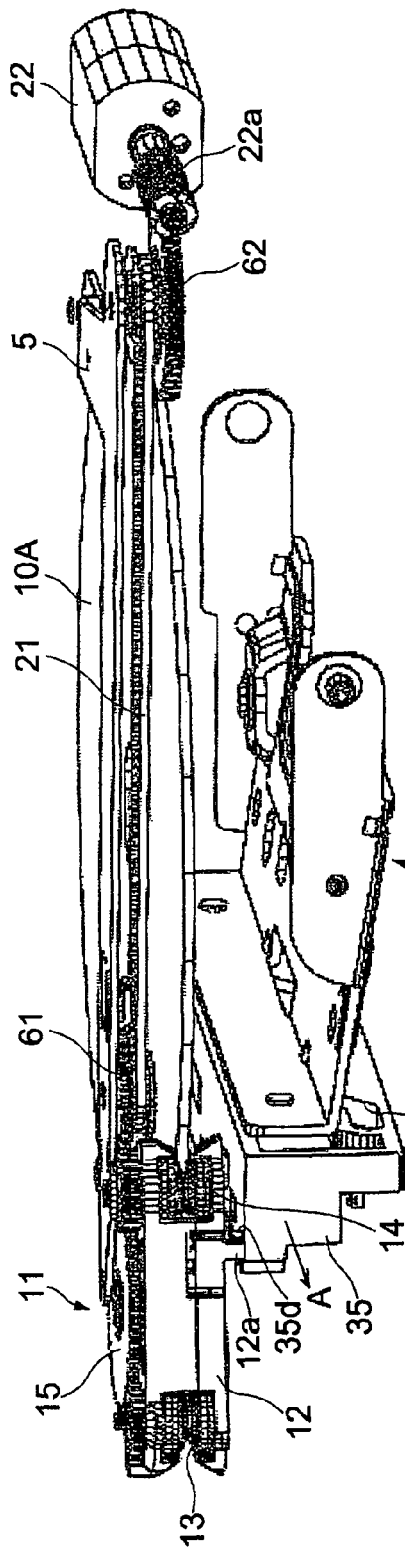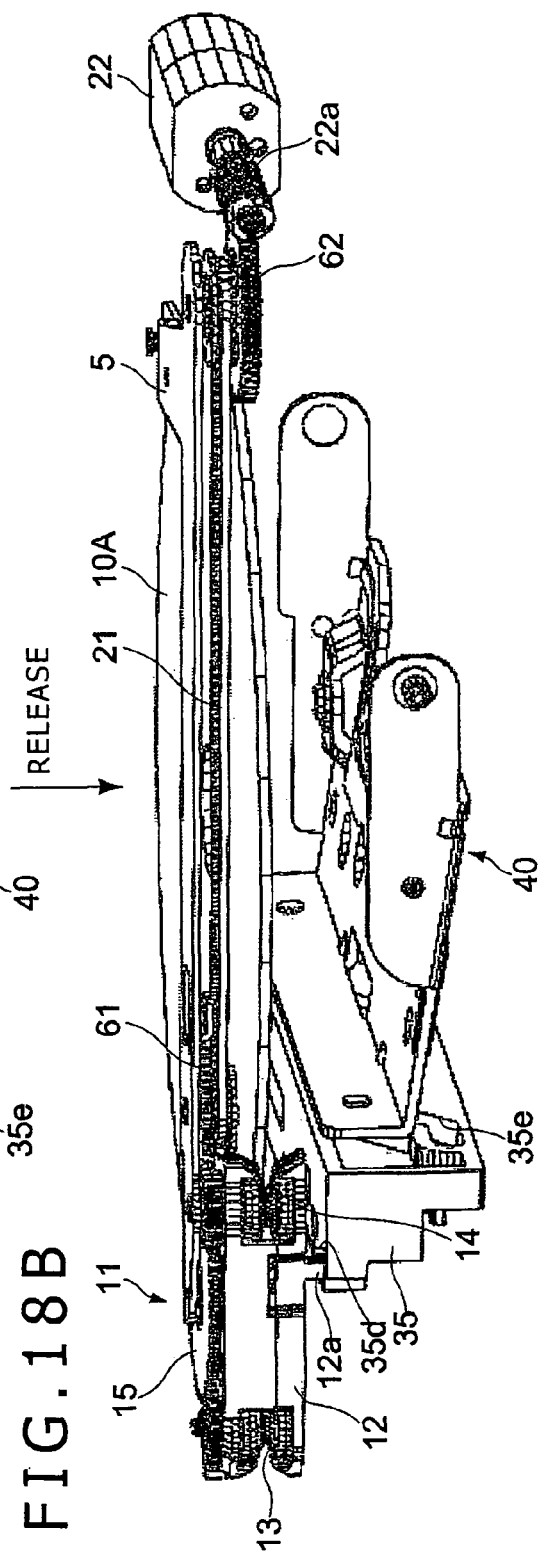

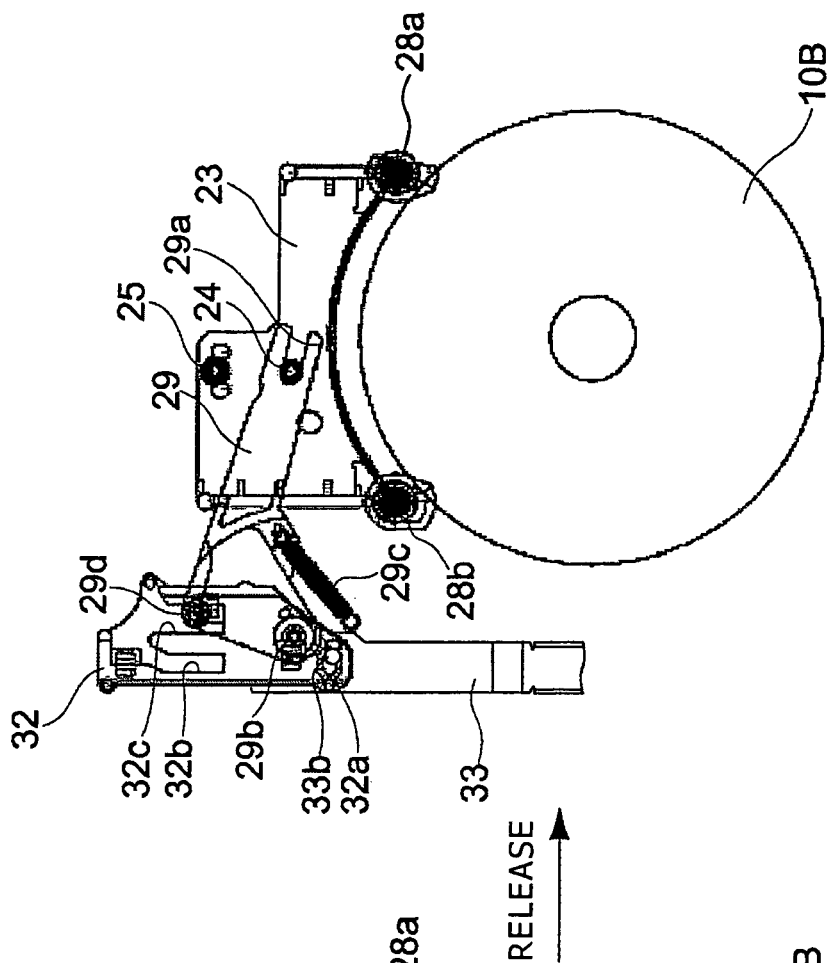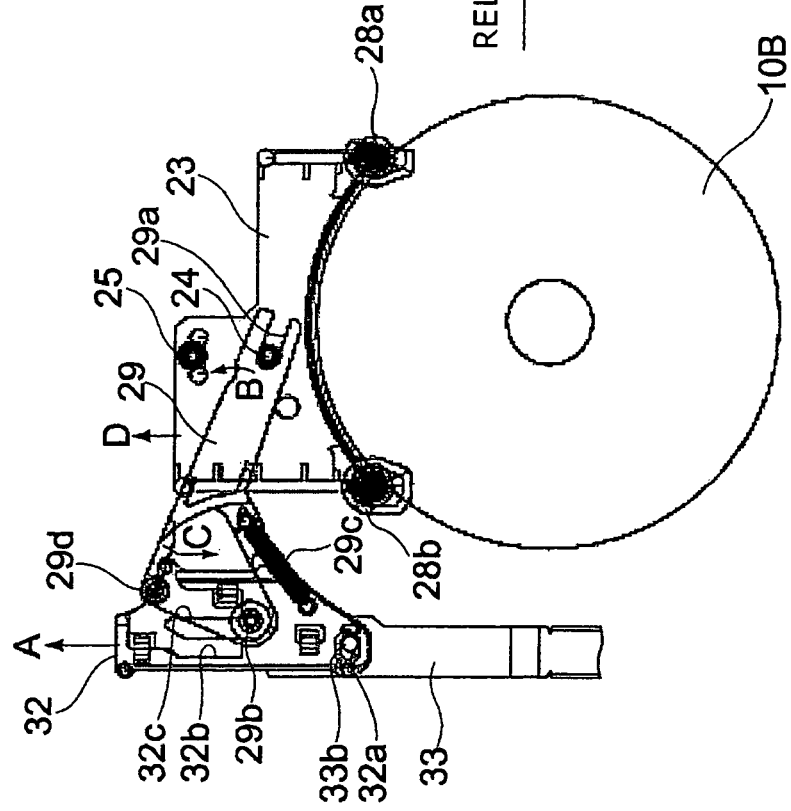

CHUCK-UP

RECORDING MEDIUM DRIVE SYSTEM AND ELECTRONIC APPARATUS

CROSS REFERENCES TO RELATED APPLICATIONS

The present invention contains subject matter related to Japanese Patent Applications JP 2006-028722, 2006-028821, 2006-036232 and 2006-036357 filed in the Japanese Patent Office on Feb. 6, 2006, Feb. 6, 2006, Feb. 14, 2006 and Feb. 14, 2006 respectively, the entire contents of which being incorporated herein by reference.

BACKGROUND OF THE INVENTION

1. Field of the Invention

The present invention relates to a recording medium drive system (disk drive system) capable of recording and reproduction of signals on a (disk-formed) recording medium such as an optical disk and an electronic apparatus incorporating the recording medium drive system (disk drive system). More particularly, the invention relates to a recording medium drive system (disk drive system), and an electronic apparatus using the same, of the so-called slot-in type in which a (disk-formed) recording medium can be inserted and discharged directly through a slot.

2. Description of the Related Art

As recording media, there have been known optical disks such as CD (Compact Disk), DVD (Digital Versatile Disk), Blu-ray disk, etc., magneto-optical disks such as MD (Mini Disc), MO (Magneto-Optical disk), etc., magnetic disks such as FD (Floppy (registered trademark) Disc), etc., memory cards incorporating a semiconductor memory, and so on, and various drive systems corresponding to these recording media have been provided.

Among these, disk drive systems for driving optical disks include a type in which a lid or door provided at a casing is opened and a disk is mounted directly onto a turntable exposed through the opened lid or door, a type (so-called clamshell type) in which a disk is mounted on a disk tray conveyed horizontally over the ranges of the inside and the outside of a system body, whereby the disk is automatically mounted on a turntable when the disk tray is drawn into the system body, and a type (so-called tray type) in which a turntable is provided as one body with the disk tray and the disk is mounted directly on the turntable when the disk tray is conveyed to the outside of the system body. However, every one of these types needs the operator to perform such an operation as opening and closing the lid or door, feeding in and out the disk tray, mounting the disk on the turntable, etc.

On the other hand, there is the so-called slot-in type disk drive system in which when a disk is simply inserted through a slot provided in the front face of a casing, the disk is automatically drawn into the inside of a system body and mounted on a turntable. In this disk drive system, when the disk is inserted through the slot, a pair of opposed guide rollers are rotated in opposite directions while clamping the disk between the guide rollers, whereby a loading operation of drawing the disk inserted through the slot into the inside of the casing and an ejecting operation of discharging the disk to the outside of the casing through the slot are carried out.

As such a slot-in type disk drive system, there has been the one that is described in Japanese Patent Laid-Open No. 2001-56994 (FIG. 1, etc.) (hereinafter referred to as Patent Document 1).

Meanwhile, in recent years, attendant on the increase in recording density in optical disk drive systems such as the development of the Blu-ray disk and drive systems therefore, the influence of dust on an optical system has been increasing and, therefore, there has been an increasing need for enhancement of dust-proofness of the optical disk drive systems.

In relation to the slot-in type disk drive system mentioned above, examples of technology known for enhancing the dust-proofness include a technology in which a flexible dust-proofing member made of artificial leather and having a slit through which a disk can be inserted is provided at a disk guide part provided on the rear of and as one body with a slot (refer to, for example, Japanese Utility Model Publication No. Hei 7-49676 (FIG. 3, etc.)). Japanese Utility Model Publication No. Hei 7-49676 is hereinafter referred to as Patent Document 2.

In addition, there is known a technology in which, instead of providing the just-mentioned slit, two flexible plates are provided on the upper and lower sides on the inside of a slot so as to shut the slot and so that end parts of the two flexible plates overlap with each other, whereby sealing performance is enhanced (refer to, for example, Japanese Utility Model Registration No. 2590967 (paragraph [0035], FIG. 8, etc.)). Japanese Utility Model Registration No. 2590967 is hereinafter referred to as Patent Document 3.

Furthermore, there is known a technology in which sheet-formed elastic members made of rubber or the like are adhered to both sides of a turning-side tip part of a shutter leaf provided turnably so as to close a slot, and the tip part is formed as an overhang part with the elastic members adhered thereto, whereby the gap between the tip part and the slot wall is closed and the dust-proofness is enhanced (refer to, for example, Japanese Patent No. 3670716 (paragraph [0008], FIG. 3, etc.)). Japanese Patent No. 3670716 is hereinafter referred to as Patent Document 4.

In addition, in the slot-in type disk drive system, in the case of conveying the disk inserted through the slot, a technique has been used in which the disk is conveyed in the inserting and discharging directions by clamping the recording surface and the opposite surface of the disk by a pair of rollers (hereinafter referred to as horizontal rollers) which can be driven in the forward and reverse directions about horizontal axes.

However, in the case of the horizontal rollers, if foreign matter such as sandy particulates or hard dust is adhered to the recording surface of the disk at the time of clamping the disk between the rollers, the recording surface may possibly be marred.

In recent years, high-density optical disks such as recordable DVD (Digital Versatile Disk) and Blu-ray disk have been developed, and in the cases of such high-density optical disks, the marring of the recording surface may be a heavier problem.

As a technology for solving the problem, Japanese Patent Laid-Open No. 2005-190645 (FIG. 4, etc., Japanese Patent Laid-Open No. 2005-190645 is hereinafter referred to as Patent Document 5) discloses a disk drive system having a pair of turning arms capable of conveying a disk while clamping an outer peripheral part of the disk, inserted through the slot, from both side surface sides.

In addition, there has also been a disk drive system in which rollers turnable about vertical axes instead of horizontal axes (hereinafter referred to as vertical rollers) are provided on the outside of the outermost diameter of the disk and the disk can be conveyed by the vertical rollers.

SUMMARY OF THE INVENTION

However, if the slit is simply provided as in the technology described in Patent Document 2, upper and lower parts of the slit make contact only in the area corresponding to the thickness of the artificial leather, so that a gap may be left at the slit, depending on the manner of inserting or removing the disk, and the gap may come to be unclosable due to secular change. Thus, this technology has been unsatisfactory as to dust-proofness.

In the technology described in Patent Document 3, though the dust-proofness is somewhat enhanced, the overlap of the flexible plates has to necessarily be little, for maintaining a favorable feeling of insertion of the disk. Therefore, the dust-proofness has been again unsatisfactory.

In the technology described in Patent Document 4, also, the area of contact between the overhang part of the elastic members and the slot is small, so that a gap may be generated between the overhang part and the slot due to secular change or the like. Therefore, it has been difficult to maintain a high dust-proofness. In addition, although the slot-in type disk drive system has the merit that the number of operating steps in inserting or removing a disk is smaller as compared with the clamshell type and tray type disk drive systems, the provision of a door member such as the above-mentioned shutter leaf increases the number of operating steps due to the door opening and closing operations, resulting in that it is hard to display the merit effectively.

Thus, there is a need for a recording medium drive system, and an electronic apparatus using the same, in which a high dust-proofness at a slot through which a recording medium is inserted and ejected can be maintained, without spoiling operability in the insertion and ejection of the recording medium.

In addition, in the technology described in Patent Document 5, for driving the turning arms, it would be necessary to push the disk inserted through the slot into the position where the disk can be gripped by the turning arms. Therefore, it is difficult to realize an insertion feeling favorable to the user.

Besides, in the vertical roller system in the past, the range in which the disk can be conveyed is narrower than that in the horizontal roller system. Therefore, it would again be necessary for the inserted disk to be pushed in to the depth by the user. In addition, since the vertical rollers are provided on the outside of the outermost diameter of the disk, it is difficult to restrict the size of the system to or below the half-height size (which is a general size standard for computer peripheral apparatuses) in the width direction (horizontal direction).

Thus, there is a need for a disk drive system, and an electronic apparatus using the same, in which the overall system size can be restricted to or below the half-height size while preventing the marring of the disk recording surface and realizing a favorable feeling of disk insertion.

Meanwhile, in the disk drive system having rollers as described in Patent Document 1, in order to position the conveyed disk to a predetermined position (hereinafter referred to as the centering position) where the disk can be mounted to the mounting part, it may be necessary to provide a guide member other than the rollers, thereby restricting the movement of the disk. Besides, in order that the disk mounted to the mounting part can be rotated, it may be necessary to separate (release) the rollers and the guide member from the disk, forming clearances therebetween.

In addition, in order to adapt such a disk drive system to the centering and release of both of a disk having a diameter of 12 cm (hereinafter referred to as large-diameter disk) and a disk having a diameter of 8 cm (hereinafter referred to as small-diameter disk) which are common as standards of the diameter of disk at present, it would be necessary to provide guide members on the basis of each of the disks, and to provide the guide members with different cams which can be selected during conveying of each disk. In this configuration, however, the mechanism is inevitably complicated, and the number of component parts is increased; as a result, it has been extremely difficult to improve the demerit of the slot-in type disk drive system that it is higher in cost than the clamshell type and tray type disk drive systems.

Thus, there is a need for a disk drive system, and an electronic apparatus using the same, in which disks differing in diameter can respectively be centered and released assuredly while using a simple mechanism.

As above-mentioned, in the disk drive system having rollers as described in Patent Document 1, in order to position the conveyed disk to a predetermined position (centering position) where the disk can be mounted to the mounting part, it may be necessary to provide a guide member other than the rollers, thereby restricting the movement of the disk. As a guide member for this purpose, there has been used, for example, a turning arm-formed guide which is turnable in parallel to the principal surface of the disk.

However, the turning arm-formed guide member is in an overlapping relationship with an optical pickup unit including a mounting part provided on the lower side thereof, so that the guide member and the optical pickup unit may interfere with each other. As a method for preventing the interference, there has been known a method in which the thread feed direction of the optical pickup is inclined, for example at 45 degrees, against the inserting direction in a plane substantially parallel to the principal surface of the disk. According to this method, however, the size of the disk drive system in the width direction is necessarily increased, and the system size cannot be restricted to or below the half-height size, which is a common size standard for computer peripheral apparatuses. Especially, in a drive system for optical disks capable of high-density recording, such as Blu-ray disk, an increase in the number of wavelengths processed tends to enlarge the size of the optical pickup itself, making it more difficult to spatially realize the half-height size.

Besides, in the turning arm-formed guide member, the points of supporting the disk move along an arcuate curve, so that it may not always possible to support the disk at appropriate positions with good balance, or the rotational stroke may be insufficient. Therefore, it would be necessary to further provide an auxiliary member such as an auxiliary guide, a relay guide, etc.

Thus, there is a need for a disk drive system, and an electronic apparatus using the same, in which a disk can be guided to the centering position while stably supporting the disk in cooperation with rollers, and an enlargement of system size can be prevented while securely obviating the interference with the optical pickup.

According to one embodiment of the present invention, there is provided a recording medium drive system including: a casing provided in a front face thereof with a slot through which to insert and discharge a recording medium having a principal surface and an opposite surface; and a sheet-formed member provided so as to close the slot and having a loop-formed deflected part which, while being deformed, is capable of making contact with at least one of the principal surface and the opposite surface of the recording medium at the times of insertion and discharge of the recording medium.

Here, examples of the recording medium include optical disks such as CD, DVD, Blu-ray disk, etc., magneto-optical disks such as MO, MD, etc., magnetic disks such as FD, etc., memory cards incorporating a semiconductor memory, and so on. The sheet-formed member is formed, for example, of non-woven fabric, artificial leather, felt or the like.

This ensures that at the times of insertion and discharge of the recording medium through the slot, the deflected part and the recording medium make contact with each other over a wide area in the inserting and discharging direction, so that dust-proofness is enhanced and penetration of dust into the inside of the disk drive system can be prevented assuredly. This is particularly effective for high-density next-generation optical disks, such as Blu-ray disk, required of high dust-proofness. In addition, since a dust-proof door is not provided for the slot, the merit of the so-called slot-in type that the number of operating steps is small can be utilized as it is while maintaining the high dust-proofness, and the degree of freedom in design can be enhanced while obviating a rise in cost.

The recording medium drive system as above may have a configuration in which the sheet-formed member includes: a first sheet-formed member provided on one side of the slot and having a first deflected part which makes contact with the principal surface of the recording medium at the times of insertion and discharge of the recording medium; and a second sheet-formed member provided on the other side of the slot and having a second deflected part which makes contact with the first deflected part oppositely in the direction perpendicular to the principal surface and which makes contact with the opposite surface of the recording medium at the times of insertion and discharge of the recording medium.

This ensures that the deflected parts of the sheet-formed members make contact with each other, whereby the contact area is enlarged and, hence, the dust-proofness can be enhanced, without raising the contact pressure.

The recording medium drive system as above may further includes a guide member provided on the rear side of the front face substantially in parallel to the slot and operative to hold the sheet-formed member and to guide the recording medium, being inserted and discharged, in the inserting direction and the discharging direction.

This makes it possible to guide the recording medium inserted through the slot into the inside of the disk drive system while preventing the penetration of dust into the disk drive system through the slot. Incidentally, the sheet-formed member is held on the guide member by adhesion, for example.

The recording medium drive system as above may further include: a first guide member provided on the rear side of the front face and on one side of the slot substantially in parallel to the slot and operative to hold the first sheet-formed member and to guide the recording medium, being inserted and discharged, in the inserting direction and the discharging direction; and a second guide member provided on the rear side of the front face and on the other side of the slot substantially in parallel to the slot so as to face the first guide member and operative to hold the second sheet-formed member and to guide the recording medium, being inserted and discharged, in the inserting direction and the discharging direction.

This ensures that, since the two guide members opposed to each other are provided with the sheet-formed members, the recording medium can be guided assuredly while enhancing the dust-proofness.

In the recording medium drive system, the guide member may be detachably attached to the casing.

This makes it possible to enhance workability in the manufacturing process, for example, at the time of providing the sheet-formed member for the guide member.

The recording medium drive system as above may have a configuration in which the first and second guide members are each rectangular plate-like in shape; the first sheet-formed member is adhered to both principal surfaces of the first guide member in the state of being folded back so as to form the first deflected part at a position spaced by a predetermined distance along the perpendicular direction from a first end part in the perpendicular direction of the first guide member; and the second sheet-formed member is adhered to both principal surfaces of the second guide member in the state of being folded back so as to form the second deflected part at a position spaced by a predetermined distance along the perpendicular direction from a second end part, opposed to the first end part, of the second guide member.

This ensures that, since the first and second sheet-formed members are adhered respectively to both principal surfaces of the plate-like first and second guide members, the first and second deflected parts can be easily formed by utilizing the thickness of the first and second guide members.

The recording medium drive system as above may have a configuration in which the first and second guide members are each rectangular plate-like in shape; the first sheet-formed member is folded back at a position spaced by a predetermined distance along the perpendicular direction from an end part in the perpendicular direction of the first guide member so as to form the first deflected part, portions of a first principal surface of the first sheet-formed member are adhered to each other, and a second principal surface opposite to the first principal surface is adhered to a principal surface of the first guide member; and the second sheet-formed member is folded back at a position spaced by a predetermined distance along the perpendicular direction from an end part in the perpendicular direction of the second guide member so as to form the second deflected part, portions of a third principal surface of the second sheet-formed member are adhered to each other, and a fourth principal surface opposite to the third principal surface of the second sheet-formed member is adhered to a principal surface of the second guide member.

This ensures that the first and second deflected parts can be easily formed by adhering the principal surfaces themselves of the first and second sheet-formed members, and the first and second sheet-formed members can be held on the first and second guide members by adhesion.

The recording medium drive system as above may further include a soft material filling the inside of the deflected part.

This ensures that, since the deflected part is increased in elasticity and strength, the contact pressure between the deflected part and the recording medium can be increased and that, since the generation of a gap between the sheet-formed member and the slot can be prevented, the dust-proofness can be further enhanced. As the soft material, for example, a foamed material such as sponge is used.

The recording medium drive system as above may have a configuration in which the guide member includes: a first guide member provided on the rear side of the front face and on one side of the slot substantially in parallel to the slot and operative to hold the sheet-formed member and to guide the recording medium, being inserted and discharged, in the inserting direction and the discharging direction; and a second guide member provided on the rear side of the front face and on the other side of the slot substantially in parallel to the slot so as to face the first guide member, operative to make contact with the deflected part of the sheet-formed member at the times of insertion and discharge of the recording medium, and operative to guide the recording medium in the inserting direction and the discharging direction while making contact with one of the principal surface and the opposite surface of the recording medium at the times of insertion and discharge of the recording medium.

This ensures that the dust-proofness can be maintained even by providing one of the two guide members with the sheet-formed member, whereby reductions in the number of component parts and in cost can be achieved as compared with the case of providing both of the two guide members with the sheet-formed members.

According to another embodiment of the present invention, there is provided an electronic apparatus including: a recording medium drive system including a first casing provided in a front face thereof with a slot through which to insert and discharge a recording medium having a principal surface and an opposite surface, and a sheet-formed member having a loop-formed deflected part which, while being deformed, is capable of making contact with at least one of the principal surface and the opposite surface of the recording medium at the times of insertion and discharge of the recording medium; and a second casing operative to hold the recording medium drive system.

Here, examples of the electronic apparatus include computers (in the case of personal computers, they may be of the notebook type or of the desk-top type), audio/visual apparatuses, game apparatuses, car navigation apparatuses, robot apparatuses, and other electronic apparatuses.

According to the one embodiment and the another embodiment of the present invention, high dust-proofness at the slot through which to insert and eject the recording medium can be maintained, without spoiling operability in the insertion and ejection of the recording medium.

According to a further embodiment of the present invention, there is provided a disk drive system including: a casing having a slot through which to insert and discharge a disk-formed recording medium; a mounting part which is provided in the casing and to which the recording medium inserted is mounted for rotating the recording medium; a first support part which is provided in the casing in the vicinity of the slot and which is movable in a first direction in a plane substantially parallel to a principal surface of the recording medium while supporting a peripheral edge part of the recording medium being inserted and discharged; a second support part which is provided in the casing in the vicinity of the slot so as to face the first support part and which is movable in a second direction opposite to the first direction while supporting a peripheral edge part of the recording medium; and a rotation drive mechanism which is provided in the casing and by which at least one of the first and second support parts can be rotated around an axis substantially orthogonal to the principal surface so as to convey the recording medium between the slot and the mounting part.

With this configuration, since the first and second support parts are provided in the vicinity of the slot, the recording medium can be inserted with a favorable insertion feeling such that the recording medium is drawn in immediately upon being inserted through the slot, without need for such operation as pushing in the recording medium in the insertion direction. In addition, since the first and second support parts can be rotated and moved while supporting the peripheral edge part of the recording medium in the course of conveying the recording medium, it is possible to prevent the marring of the recording surface of the recording medium during the conveying. Moreover, the recording medium can be securely conveyed according to the movement of the peripheral edge part of the recording medium, while restricting the size of the disk drive system in the width direction (horizontal direction) to or below the half-height size, which could be realized with difficulty in the case where the positions of support parts are fixed.

Here, examples of the disk-formed recording medium include optical disks such as CD, DVD, Blu-ray disk, etc., and magneto-optical disks such as MD. In addition, the rotation drive mechanism applies a rotating force by use of a motor, for example.

The disk drive system as above may further include a first arm which is connected to the first support part at one end thereof and which is turnable in a third direction in the substantially parallel plane around a shaft provided at the other end thereof; and a second arm which is connected to the second support part at one end thereof and which is turnable in a fourth direction opposite to the third direction around a shaft provided at the other end thereof in conjunction with the first arm.

With this configuration, the first support part and the second support part can be moved in conjunction with each other by turning the first arm and the second arm in conjunction with each other, so that the recording medium can be conveyed efficiently and smoothly. Here, the third direction may be the same as the first direction, and the fourth direction may be the same as the second direction.

The disk drive system as above may have a configuration wherein the recording medium is a first recording medium having a first diameter or a second recording medium having a second diameter smaller than the first diameter; the first support part includes a third support part capable of supporting the first recording medium, and a fourth support part provided on the mounting part side relative to the third support part, connected to the first arm in an articulated manner and capable of supporting the first and second recording media; the second support part includes a fifth support part capable of supporting the first recording medium, and a sixth support part provided on the mounting part side relative to the fifth support part, connected to the second arm in an articulated manner and capable of supporting the first and second recording media; and the disk drive system further includes a first base member holding the third and fourth support parts, and a second base member holding the fifth and sixth support parts.

With this configuration, when the first recording medium is inserted, the first recording medium is first conveyed while being supported by the third support part of the first support part and by the fifth support part of the second support part, and is then conveyed while being supported by the fourth support part of the first support part and by the sixth support part of the second support part. At the time of discharging the first recording medium, this procedure is reversed. In addition, the second recording medium is conveyed while being always supported by the fourth support part and the sixth support part. This makes it possible to covey two types of recording media differing in diameter, and to enhance the feeling of insertion of each recording medium.

In addition, since each support part is held by the first and second base members and the fourth and sixth support parts are connected to the first and second arms in an articulated manner, the third and fourth support parts and the fifth and sixth support parts as respective single blocks are moved in the manner of being opened and closed integrally with the arms, attendant on the turning of the first and second arms. This enables smoother conveying of the recording medium, and the size of the disk drive system in the width direction can be restricted to or below the half-height size.

Incidentally, the positions of the third and fifth support parts and the fourth and sixth support parts are regulated, for example, by the urging forces of springs provided at the first and second arms, and the support parts can be moved by turning of the first and second arms against the urging forces.

The disk drive system as above may have a configuration wherein the third support part and the fourth support part are so provided as to be rotatable in conjunction with each other; and the fifth and sixth support parts are so provided as not to be rotatable.

With this configuration, by fixing the fifth and sixth support parts, the recording medium can be conveyed in the manner of being rotated in parallel to the principal surface of the recording medium around the fifth and the sixth support parts. This makes it possible to reduce the number of component parts for the rotation drive mechanism and the cost and to reduce the driving force of a motor, for example, as compared with the case where the fifth and sixth support parts are also rotatable. In addition, by interlocking the third support part with the fourth support part, the first recording medium can be conveyed more smoothly, as compared with the case where the support parts are rotated individually.

The disk drive system as above may have a configuration wherein the rotation drive mechanism includes: a first gear provided at the third support part; a second gear provided at the fourth support part; a third gear provided at the first base part and meshed with the first and second gears; and a motor operative to rotatingly drive the first, second and third gears.

With this configuration, since the first and second gears are connected to the third gear, the third and fourth support parts can be rotated in the same phase and at an equal speed by driving the motor, so that the first and second recording media can be conveyed further smoothly. In addition, since the connection of the third and fourth support parts by the gears ensures that a load lower than that in the case of connection by a belt or the like suffices, a more smoother conveying of the recording media can be achieved.

The disk drive system may further include a control unit which is provided in the casing, detects the insertion of the first recording medium before the inserted first recording medium makes contact with the third and fifth support parts, or detects the insertion of the second recording medium before the inserted second recording medium makes contact with the fourth and sixth support parts, and is capable of such a control as to drive the motor on the basis of the result of the detection.

With this configuration, the rotation of the third and fourth support parts can be started before each recording medium makes contact with the support parts. Therefore, it is possible to realize a favorable insertion feeling such that the recording medium is naturally drawn in, without need for pushing the recording medium toward the depth side from the slot. The control unit includes, for example, a photo-sensor, a substrate and the like.

The disk drive system may further include a first control unit capable of such a control as to detect the movement of the fourth or sixth support part to a predetermined first position and to stop the driving of the motor on the basis of the detection, at the time of discharging the first recording medium; and a second control unit capable of such a control as to detect the movement of the fourth or sixth support part to a predetermined second position and to stop the driving of the motor on the basis of the detection, at the time of discharging the second recording medium.

With this configuration, the discharge amounts of the first and second recording media are detected based on the moving amount of the fourth or sixth support part, i.e., the opening amounts of the arms and the support parts, and the driving of the motor is stopped accordingly. Therefore, each of the first and second recording media can be discharged to an appropriate position where it is easy for the recording medium to be taken out from the slot by the user, while preventing the recording medium from flying out through the slot or from being discharged by an insufficient amount.

According to yet another embodiment of the present invention, there is provided an electronic apparatus including: a disk drive system including a first casing having a slot through which to insert and discharge a disk-formed recording medium, a mounting part which is provided in the first casing and to which the recording medium inserted is mounted for rotating the recording medium, a first support part which is provided in the first casing in the vicinity of the slot and which is movable in a first direction in a plane substantially parallel to a principal surface of the recording medium while supporting a peripheral edge part of the recording medium being inserted and discharged, a second support part which is provided in the first casing in the vicinity of the slot so as to face the first support part and which is movable in a second direction opposite to the first direction while supporting a peripheral edge part of the recording medium, and a rotation drive mechanism which is provided in the first casing and by which at least one of the first and second support parts can be rotated around an axis substantially orthogonal to the principal surface so as to convey the recording medium between the slot and the mounting part; and a second casing holding the disk drive system.

According to the further embodiment and the yet another embodiment of the present invention, it is possible to restrict the overall system size to or below the half-height size while preventing the marring of the recording surface of the disk and realizing a favorable feeling of insertion of the disk.

According to a yet further embodiment of the present invention, there is provided a disk drive system including: a casing having a slot through which to insert and discharge a disk-formed first recording medium having a first diameter or a disk-formed second recording medium having a second diameter smaller than the first diameter; a mounting part which is provided in the casing and to which the inserted first or second recording medium is mounted for rotating the first or second recording medium; a roller mechanism which is provided at a first position in the vicinity of the slot in the casing and which has a roller capable of conveying the first or second recording medium between the slot and the mounting part by rotating around an axis substantially perpendicular to a principal surface of the first or second recording medium while supporting a peripheral edge part of the first or second recording medium to be inserted and discharged; and a guide mechanism which is provided at a second position on the mounting part side relative to the first position and which is capable of guiding the first or second recording medium to a centering position permitting mounting of the first or second recording medium to the mounting part while supporting a peripheral edge part of the first or second recording medium conveyed by the roller mechanism.

With this configuration, since the guide mechanism can center both the first and second recording media differing in diameter, the mechanism can be simplified as compared with the case where guide mechanisms are provided respectively for the different disks. In addition, by suppressing the increase in the number of component parts and increasing the spatial margin in the casing, it is possible to enable easy diversion of inexpensive component parts ordinarily used for disk drive systems of the other types than the slot-in type, for example, the tray type, and to promise a reduction in the manufacturing cost.

The disk drive system as above may have a configuration wherein the roller of the roller mechanism is capable of moving while supporting the second recording medium from the first position to a third position where the supported second recording medium is set at the centering position, in a plane substantially parallel to a principal surface of the inserted first or second recording medium; and the guide mechanism which is provided so as to be movable in the inserting and discharging directions from the second position to a fourth position where the supported first recording medium is set at the centering position and by which the second recording medium located at the centering position is supported at a fifth position between the second position and the fourth position.

With this configuration, the first recording medium is centered through restriction of its movement by the moving and conveying ranges of the guide mechanism, whereas the second recording medium is centered through restriction of its movement by the moving ranges of the roller of the roller mechanism. Therefore, the guide mechanism does not need respective mechanisms for centering the first and second recording media, so that the first and second recording media can respectively be centered assuredly while using a simple mechanism.

The disk drive system as above may have a configuration wherein the guide mechanism is capable of canceling the supporting by moving by a predetermined distance in the inserting direction from the fourth position in the case where the first recording medium is located at the centering position, and the guide mechanism is capable of canceling the supporting by moving by a predetermined distance in the inserting direction from the fifth position in the case where the second recording medium is located at the centering position.

With this configuration, the first and second recording media can respectively be released easily by the movement of the guide mechanism in the same direction.

The disk drive system as above may have a configuration wherein the roller mechanism includes: a roller unit which has a first roller capable of supporting the inserted first recording medium, and a second roller provided on the mounting part side relative to the first roller and capable of supporting the first recording medium conveyed by the first roller and the inserted second recording medium, and which is movable from the first position to the third position; and a support unit which has a first support member provided in the vicinity of the slot so as to face the first roller and capable of supporting the inserted first recording medium, and a second support member provided on the mounting part side relative to the first support member so as to oppose to the second roller and capable of supporting the first recording medium conveyed by the first roller and the inserted second recording medium, and which is movable in the direction opposite to the roller unit.

This ensures that, when the first recording medium is inserted, the first recording medium in the state of being supported by the first roller of the roller unit and the first support member of the support unit is first conveyed in the inserting direction so as to be rotated substantially in parallel to the above-mentioned principal surface by the rotation of the first roller. Subsequently, the first recording roller in the state of being supported by the second roller of the roller unit and the second support member of the support unit is conveyed similarly by the rotation of the second roller. The guide mechanism waits for the first recording medium thus conveyed by the second roller and the second support member, and restricts the conveying in the fourth position, i.e., the centering position, while supporting the first recording medium. At the time of conveying the second recording medium, the conveying is carried out by the second roller and the second support member, without intermediation by the first roller and the first support member; in this case, the guide mechanism waits for the second recording medium thus conveyed, and, while supporting the second recording medium, guide the second recording medium to the third position beyond which the second roller cannot convey the second recording medium, i.e., the centering position. Therefore, the centering position for the second recording medium is determined by the movable ranges of the second roller and the second support member, and it is unnecessary for the guide mechanism to determine the centering position for the second recording medium, so that the mechanism for centering can be simplified.

The disk drive system as above may further include an arm unit which has a connecting part provided in the casing so as to be turnable around the perpendicular axis and connected to the guide mechanism so as to be turned in conjunction with the guide mechanism, and a projection part provided to project in the perpendicular direction; and a guide unit which is provided in the casing so as to be movable in the inserting direction, and which has a first guide groove formed in the inserting direction and capable of guiding the projection part in the case where the arm unit is turned according to the movement of the guide mechanism to the fourth position, and a second guide groove formed substantially in parallel to the first guide groove and capable of guiding the projection part in the case where the arm unit is turned according to the movement of the guide mechanism to the fifth position; wherein the guide mechanism is capable of canceling the supporting of the first recording medium in the case where the guide unit is moved so that the projection part is guided by the first guide groove, and the guide mechanism is capable of canceling the supporting of the second recording medium in the case where the guide unit is moved so that the projection part is guided by the second guide groove.

With this configuration, each recording medium can be released by moving the guide mechanism in the inserting direction after the recording medium is centered, by the operations of the arm unit and the guide unit.

The disk drive system as above may further include a pickup unit which has the mounting part and which is capable of recording or reproduction of a signal on the first and second recording media mounted to the mounting part while rotating the first and second mounting media; and a lift mechanism for lifting the pickup unit up and down in the perpendicular direction in order to mount the centered first or second recording medium to the mounting part; wherein the guide unit is connected to the lift mechanism so as to be movable in conjunction with a lifting operation of the lift mechanism.

With this configuration, the lifting operation for the pickup unit and the above-mentioned releasing operation can be performed in conjunction with each other. Therefore, the operations up to the recording or reproduction of signals on the centered first and second recording media can be carried out swiftly and smoothly, while reducing the loss.

According to still another embodiment of the present invention, there is provided an electronic apparatus including: a disk drive system including a first casing having a slot through which to insert and discharge a disk-formed first recording medium having a first diameter or a disk-formed second recording medium having a second diameter smaller than the first diameter, a mounting part which is provided in the first casing and to which the inserted first or second recording medium is mounted for rotating the first or second recording medium, a roller mechanism which is provided at a first position in the vicinity of the slot in the first casing and which has a roller capable of conveying the first or second recording medium between the slot and the mounting part by rotating around an axis substantially perpendicular to a principal surface of the first or second recording medium while supporting a peripheral edge part of the first or second recording medium to be inserted and discharged, and a guide mechanism which is provided at a second position on the mounting part side relative to the first position and which is capable of guiding the first or second recording medium to a centering position permitting mounting of the first or second recording medium to the mounting part while supporting a peripheral edge part of the first or second recording medium conveyed by the roller mechanism; and a second casing capable of holding the disk drive system.

Here, examples of the electronic apparatus include computers (in the case of personal computers, inclusive of the notebook type and the desk-top type), audio/visual apparatuses, car navigation apparatuses, robot apparatuses, and other electronic apparatuses.

According to the yet further embodiment and the still another embodiment of the present invention, the disks differing in diameter can respectively be centered and released assuredly, while using a simplified cam mechanism.

According to a still further embodiment of the present invention, there is provided a disk drive system including: a casing provided in a front face thereof with a slot through which to insert and discharge a disk-formed recording medium; a pickup unit which is provided in the casing, and which includes a mounting part for mounting the inserted recording medium thereto, a rotation drive mechanism for rotatingly driving the recording medium mounted to the mounting part about an axis substantially perpendicular to a principal surface of the recording medium, a pickup mechanism capable of reproducing a signal recorded on the recording medium rotatingly driven by the rotation drive mechanism, and a pickup moving mechanism for moving the pickup mechanism in a radial direction of the recording medium; a roller mechanism which is provided in the vicinity of the slot in the casing and which has a roller capable of conveying the recording medium between the slot and the mounting part by rotating about an axis substantially parallel to the substantially perpendicular axis, while supporting a peripheral edge part of the recording medium to be inserted and discharged; and a guide mechanism provided in the inserting direction of the roller mechanism and in the substantially perpendicular direction of the pickup unit and which is capable of guiding the recording medium to a centering position permitting mounting of the recording medium to the mounting part, by moving in the inserting direction while supporting a peripheral edge part of the recording medium conveyed by the roller mechanism.

This ensures that the guide mechanism is moved rectilinearly in the inserting direction while supporting the recording medium in cooperation with the roller mechanism, and, therefore, the recording medium can be guided to the centering position with high stability.

Here, examples of the disk-formed recording medium include optical disks such as CD, DVD, Blu-ray disk, etc. and magneto-optical disks such as MD, etc.

In the disk drive system as above, the guide mechanism may include: a first support part which is provided in the vicinity of the roller mechanism and which is capable of supporting a peripheral edge part of the recording medium; and a second support part which is provided substantially in symmetry with the first support part with respect to the inserting direction and a diameter direction of the recording medium and which is capable of supporting a peripheral edge part of the recording medium.

With this configuration, each support part is provided so as to be astride the pickup mechanism, whereby the recording medium being conveyed can constantly be supported by the same two points while securing a clearance between the support part and the pickup mechanism. Therefore, the guide mechanism, in cooperation with the roller mechanism, can guide the recording medium to the centering position with higher stability, while preventing the interference with the pickup mechanism. In addition, this configuration eliminates the need to further provide other guide member or the like for assisting the guide mechanism.

In the disk system as above, each of the first and second support parts may have a necked part for restricting the peripheral edge part in the perpendicular direction.

With this configuration, the first and second support parts support the recording medium so that the peripheral edge part of the recording medium is clamped by the necked parts, whereby the recording medium can be guided to the centering position more assuredly through restriction of its movement in the perpendicular direction.

The disk drive system as above may further include a frame which is provided in the casing, which holds the roller mechanism and the guide mechanism, and which has a guide groove formed in the inserting direction, wherein the guide mechanism includes: a projection part provided to project in the perpendicular direction and slidably engaged with the guide groove, and an urging member connected to the frame and operative to urge the guide mechanism in the discharging direction.

This ensures that the guide mechanism waits for the conveyed recording medium in the vicinity of the roller mechanism under the urging force of the urging member, and, after contacted by the recording medium, the guide mechanism is slid in the inserting direction with a large stroke along the guide groove against the urging force while supporting the recording medium by the urging force. Therefore, the recording medium can be guided more stably, and it is made unnecessary to further provide other guide member or the like for relaying the recording medium between the roller mechanism and the guide mechanism. In addition, with the guide mechanism slidably provided on the frame, its interference with the pickup mechanism can be prevented. Here, the urging member is composed, for example, of an elastic member such as a coil spring, rubber, etc.

In the disk drive system as above, the pickup unit may be so provided that the pickup moving mechanism moves the pickup mechanism in the inserting direction.

With this configuration, the pickup unit is disposed in such a direction that the pickup moving mechanism moves the pickup mechanism in parallel to the guide mechanism. Therefore, while preventing interference between the guide mechanism and the pickup mechanism, an increase in the size of the disk drive system in the width direction can be suppressed, as compared with the case where the moving directions are non-parallel, and the size of the disk drive system can be restricted to or below the half-height size.

In the disk drive system as above, the recording medium may be a first recording medium having a first diameter or a second recording medium having a second diameter smaller than the first diameter.

This makes it possible to guide each recording medium to a centering position with high stability, according to the two recording media differing in diameter. In this case, the roller mechanism may have a roller for feeding the first recording medium and a roller for feeding the second recording medium.

According to a still more further embodiment of the present invention, there is provided an electronic apparatus including: a disk drive system including a first casing provided in a front face thereof with a slot through which to insert and discharge a disk-formed recording medium, a pickup unit which is provided in the first casing and which includes a mounting part for mounting the inserted recording medium thereto, a rotation drive mechanism for rotatingly driving the recording medium mounted to the mounting part about an axis substantially perpendicular to a principal surface of the recording medium, a pickup mechanism capable of reproducing a signal recorded on the recording medium rotatingly driven by the rotation drive mechanism, and a pickup moving mechanism for moving the pickup mechanism in a radial direction of the recording medium, a roller mechanism which is provided in the vicinity of the slot in the first casing and which has a roller capable of conveying the recording medium between the slot and the mounting part by rotating about an axis substantially parallel to the substantially perpendicular axis, while supporting a peripheral edge part of the recording medium to be inserted and discharged, and a guide mechanism provided in the inserting direction of the roller mechanism and in the substantially perpendicular direction of the pickup unit and which is capable of guiding the recording medium to a centering position permitting mounting of the recording medium to the mounting part, by moving in the inserting direction while supporting a peripheral edge part of the recording medium conveyed by the roller mechanism; and a second casing capable of holding the disk drive system.

Here, examples of the electronic apparatus include computers (in the case of personal computers, inclusive of the notebook type and the desk-top type), audio/visual apparatuses, car navigation apparatuses, robot apparatuses, and other electronic apparatuses.

According to the still further embodiment and the still more further embodiment of the present invention, the disk can be guided to the centering position while supporting it with high stability between the guide mechanism and the rollers, and an increase in the system size can be prevented while securely preventing the interference between the guide mechanism and the optical pickup.

BRIEF DESCRIPTION OF THE DRAWINGS

FIGS. 16A and 16B are views showing the manners of a rear guide, a rear guide arm, a rear cam slider and a connection slider before and after releasing the large-diameter optical disk, in one embodiment of the present invention;

FIGS. 17A and 17B are views, as viewed from the upper side of the disk drive system, showing the manners of the arms, the roller blocks, and the main cam slider before and after releasing the large-diameter disk, in one embodiment of the present invention;

FIGS. 18A and 18B are views, as viewed from a side surface of the disk drive system, of a part of the arm, the roller block, the main cam slider and the pickup unit before and after releasing the large-diameter optical disk, in one embodiment of the present invention;

FIGS. 23A and 23B are views showing the manners of the rear guide, the rear guide arm, the rear cam slider and the connection slider before and after releasing the small-diameter optical disk, in one embodiment of the present invention;

DETAILED DESCRIPTION OF THE PREFERRED EMBODIMENT

Now, some embodiments of the present invention will be described below, based on the drawings.

Figure 1:
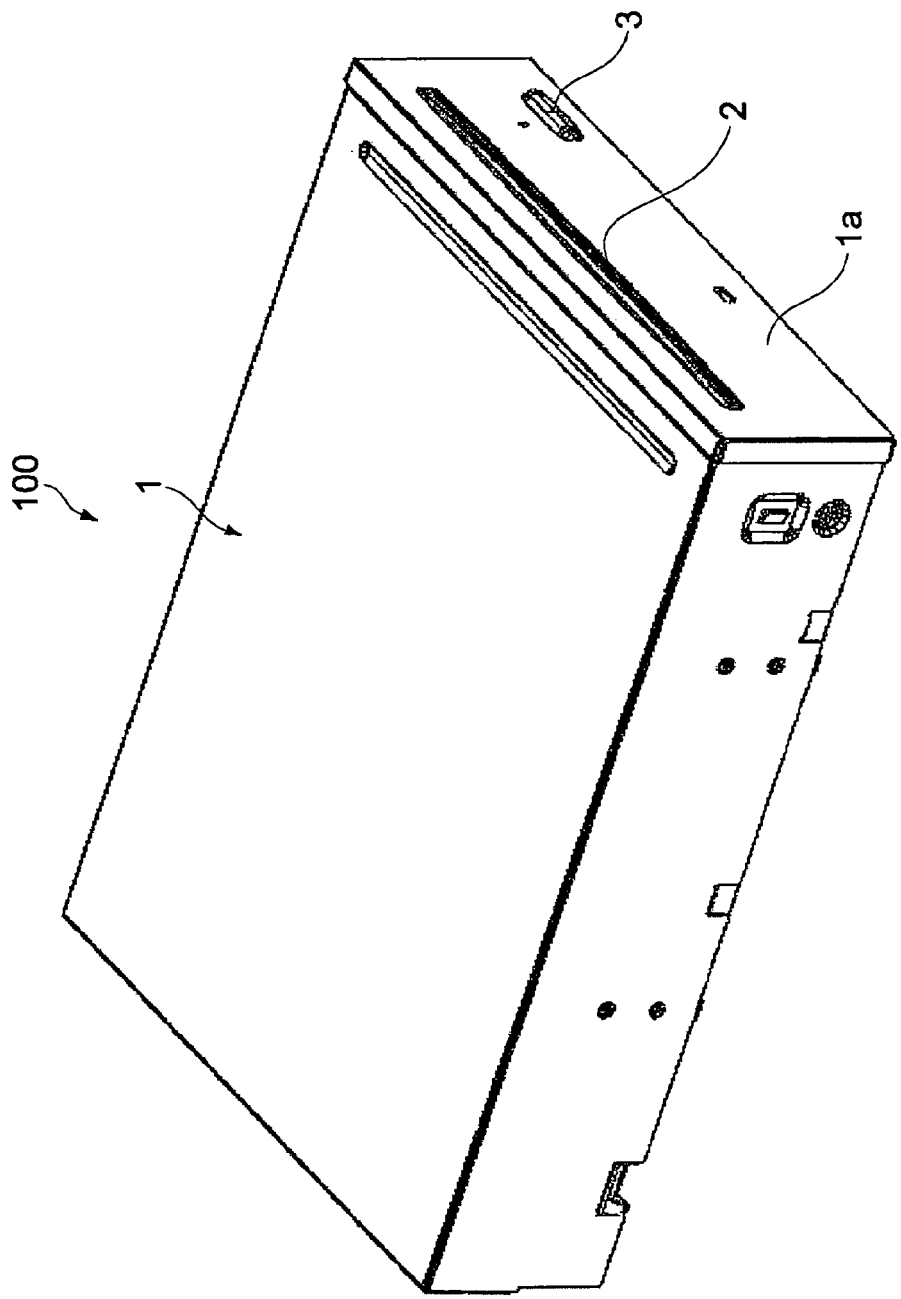
FIG. 1 is a perspective view showing the appearance of a disk drive system according to one embodiment of the present invention.
Figure 2:
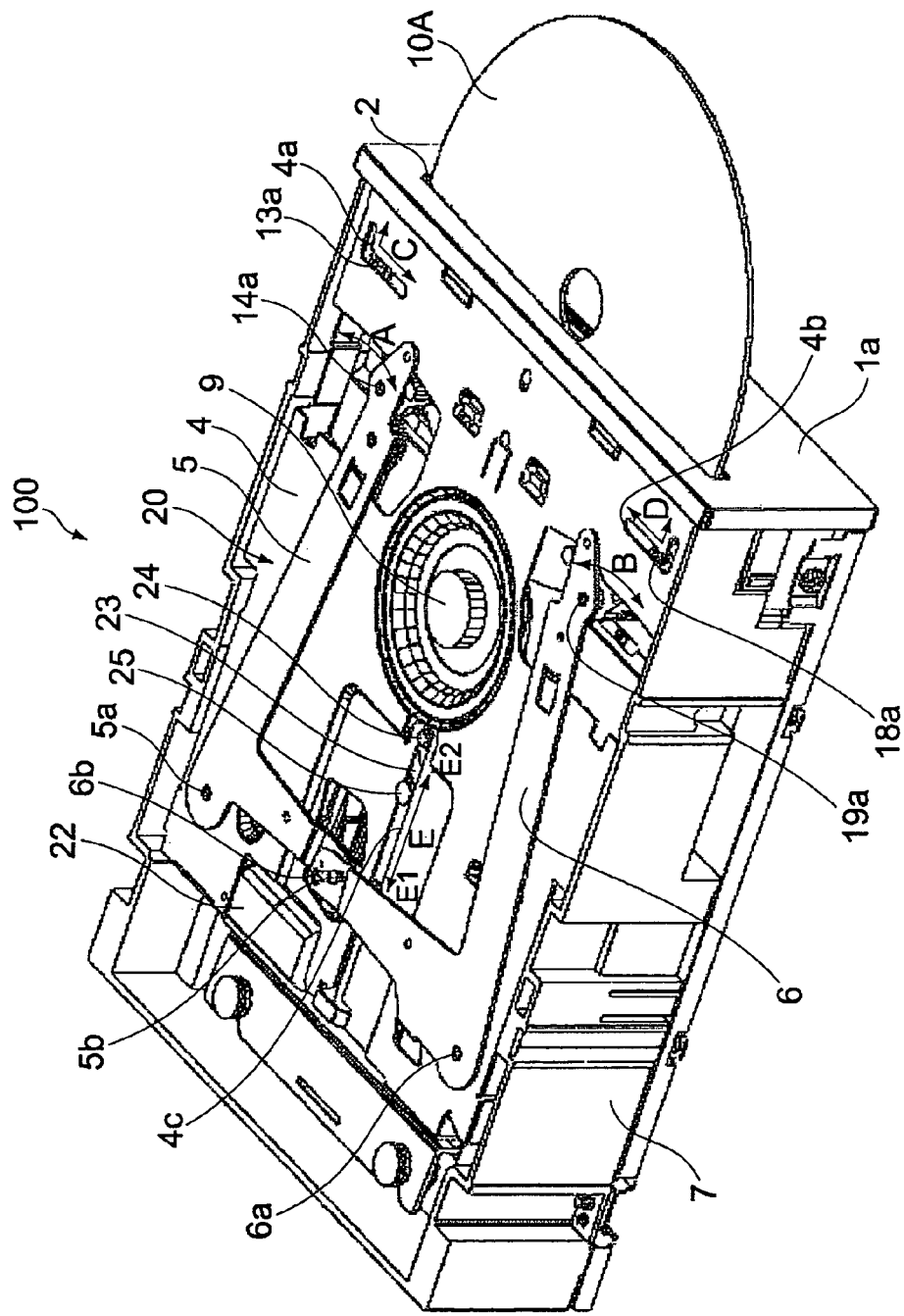
FIG. 2 is a perspective view of the condition where a casing (exclusive of a front panel) of the disk drive system shown in FIG. 1 is removed.
Figure 3:
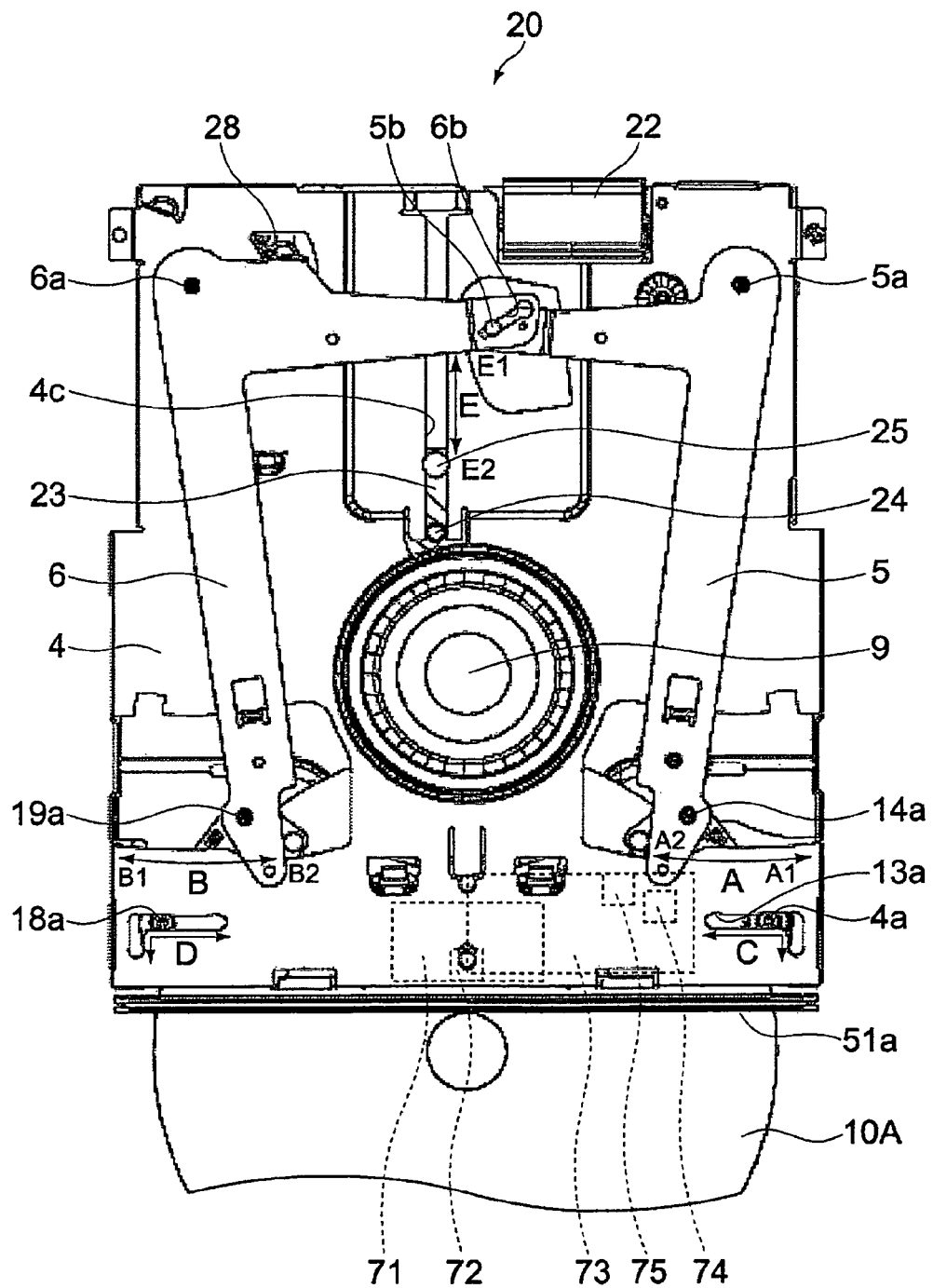
FIG. 3 is a plan view of a loading unit of FIG. 2.
Figure 4:
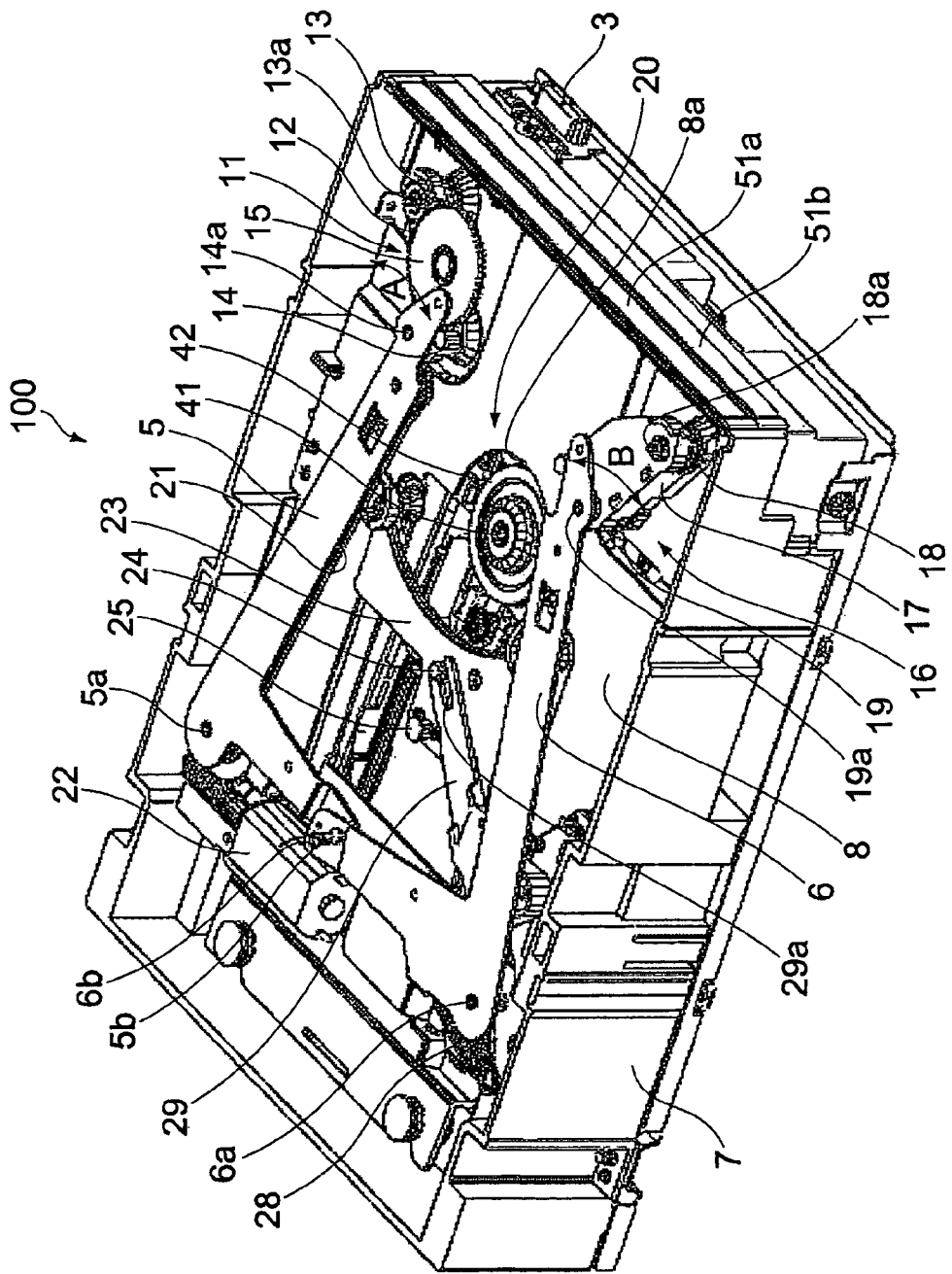
FIG. 4 is a perspective view of the condition where an upper frame of FIGS. 2 and 3 is removed.
Figure 5:
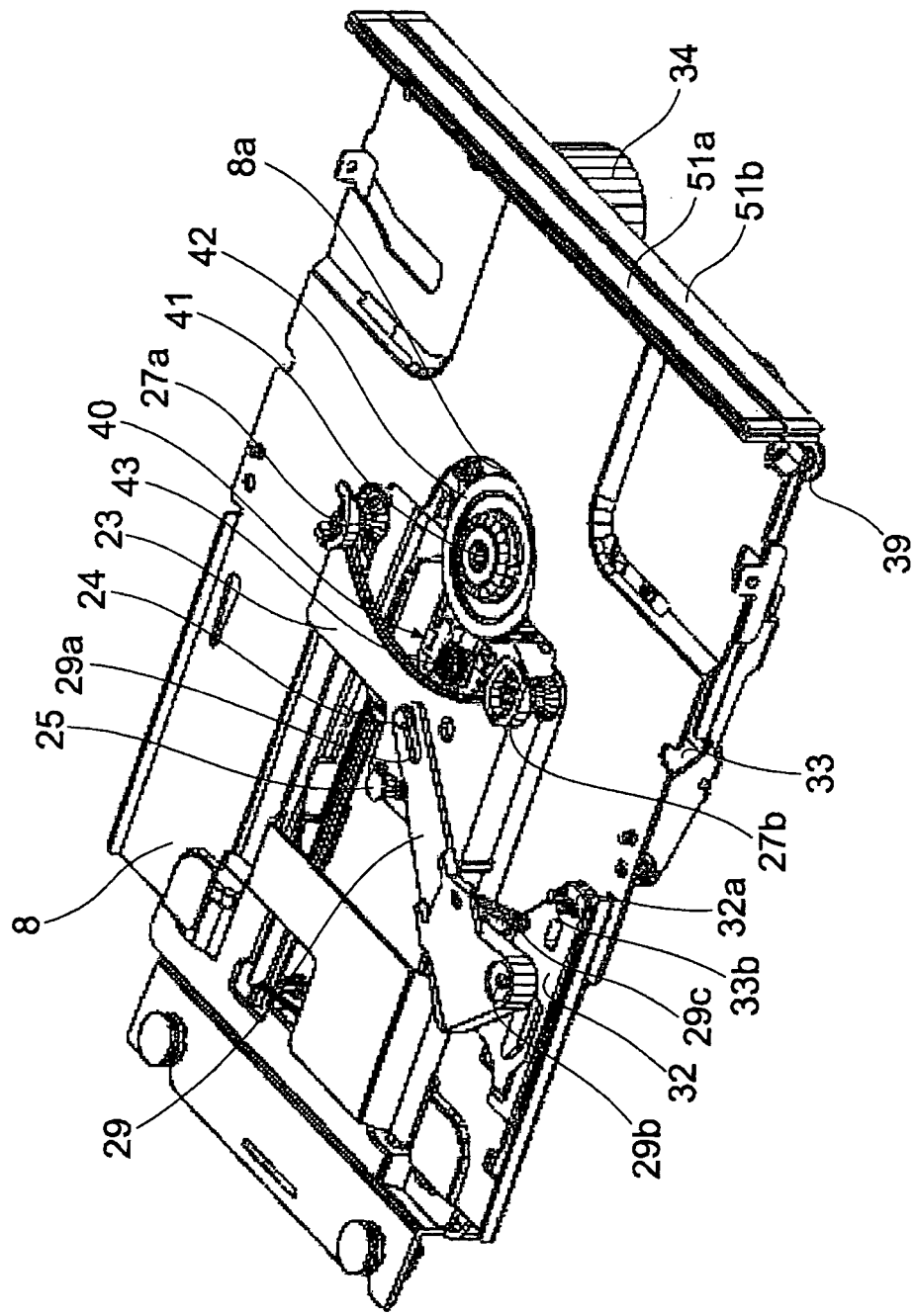
FIG. 5 is a perspective view of the condition where a main frame, arms, roller blocks, a loading motor and the like of FIG. 4 are removed, and is a perspective view of the condition where the upper frame of FIG. 2 is removed.

FIG. 1 is a perspective view showing the appearance of a disk drive system 100 according to this embodiment; FIG. 2 is a perspective view of the condition where a casing 1 (exclusive of a front panel 1a) of the disk drive system 100 in FIG. 1 is removed; FIG. 4 is a perspective view of the condition where an upper frame 4 of FIGS. 2 and 3 is removed; and FIG. 5 is a perspective view of the condition where a main frame 7, arms 5 and 6, roller blocks 11 and 16, a loading motor 22 and the like of FIG. 4 are removed.

As shown in these figures, the disk drive system 100 has a casing 1 formed, for example, of a sheet metal. In its thickness direction, the casing 1 has, for example, the half-height (about 1.6 in) size, which is a standard size for incorporation of a disk drive into a desk-top type PC. The disk drive system 100 can perform recording and reproduction on two different optical disks 10, i.e., a large-diameter optical disk 10A having a diameter of 12 cm as shown in FIG. 2 and a small-diameter optical disk 10B having a diameter of 8 cm (not shown), by inserting and discharging the optical disks 10. A front panel 1a of the casing 1 is provided with a slot 2 through which to insert and discharge the large-diameter optical disk 10A and the small-diameter optical disk 10B. Examples of the optical disks 10 include CD, DVD, and Blu-ray disk. In addition, at the front panel 1a, an eject button 3 is provided for discharging each of the optical disks 10A and 10B inserted via the slot 2. Incidentally, in the following description, the simple expression of optical disk 10 will be used where distinction between the large-diameter optical disk 10A and the small-diameter optical disk 10B is unnecessary.

As shown in FIGS. 2 and 4, a main frame 7 made of a resin, for example, is provided in the inside of the casing 1 of the disk drive system 100, and a loading unit 20 for loading the optical disk 10 inserted via the slot 2 is provided in the main frame 7. FIG. 3 is a plan view of the loading unit 20.

The loading unit 20 has an upper frame 4 and a lower frame 8 which are each formed of a thin sheet metal, for example. The upper frame 4 of the loading unit 20 is provided with a roller block 11 and a roller block 16 for loading the optical disk 10 inserted through the slot 2, and with an arm 5 and an arm 6 which are opposed to each other in the left-right direction.

The arm 5 and the arm 6 are so supported that they can be turned so as to slide on the upper frame 4 horizontally (in the directions of arrows A and B in both the figures), with a turning shaft 5a and a turning shaft 6a as centers, respectively. In addition, both the arms are connected at their rear parts by the engagement between a connection shaft 5b provided on the arm 5 and a connection groove 6b provided in the arm 6, and they can be turned in an interlocked manner through guiding of the connection shaft 5b by the connection groove 6b. Besides, as shown in FIGS. 3 and 4, the arm 6 has a coil spring 28, one end of the coil spring 28 is supported by the upper frame 4, and the other end is connected to the arm 6. The arm 6 and the arm 5 connected to the arm 6 are urged in the directions for turning toward the inner side of the disk drive system 100 (in the directions of arrows A2 and B2 in FIG. 3) by the coil spring 28.

As shown in FIG. 4, tips of the arm 5 and the arm 6 are connected to the roller block 11 and the roller block 16 through an articulated shaft 14a and an articulated shaft 19a, respectively. This ensures that the roller block 11 and the roller block 16 can be driven interlockedly with the arm 5 and the arm 6. In addition, as shown in FIGS. 2 to 4, the loading unit 20 is provided on the rear side of the upper frame 4 with a loading motor 22 for driving the roller block 11.

Figure 7:
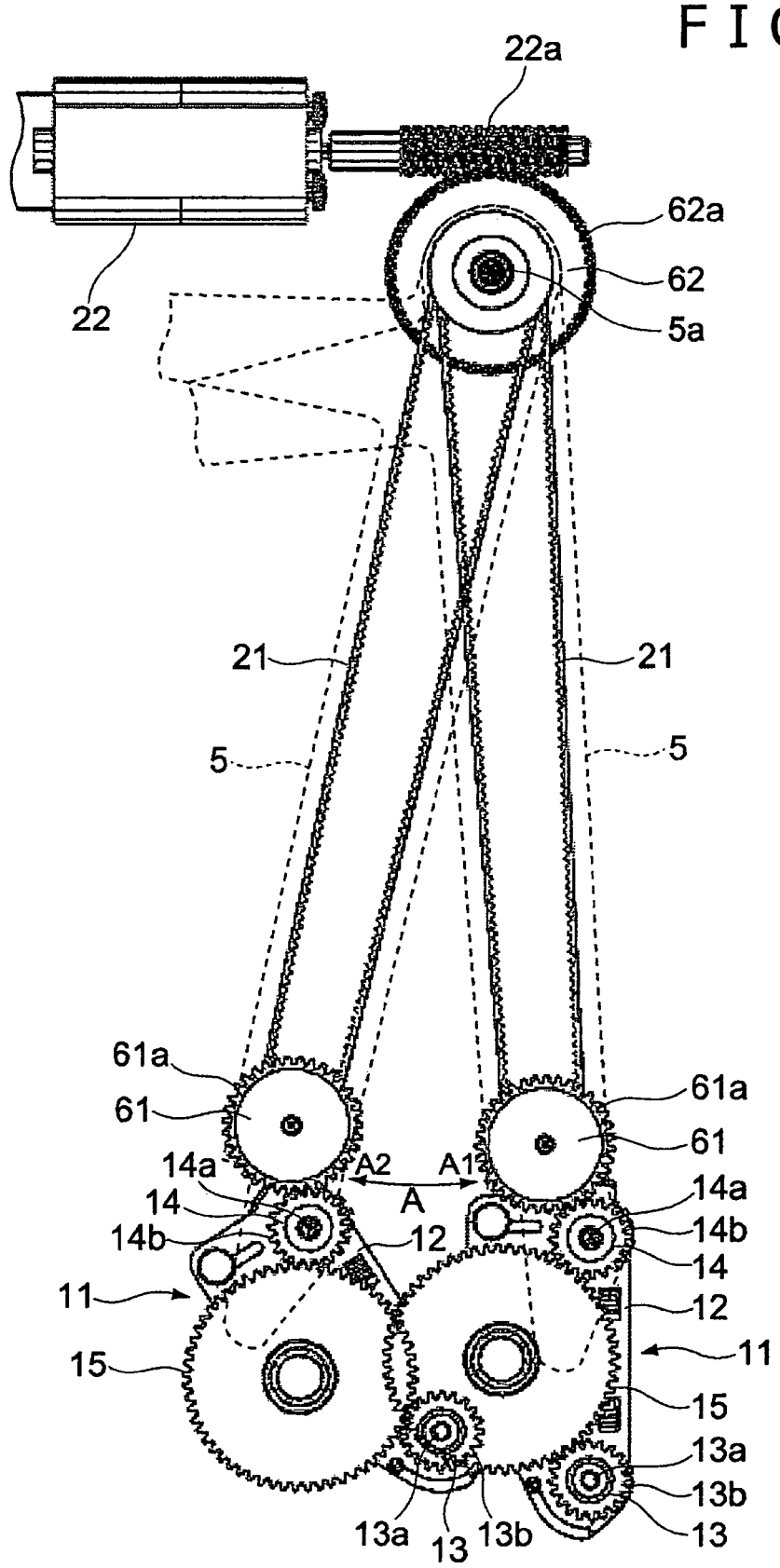
FIG. 7 is a view showing the details of the arm and the roller block shown in FIG. 4.

FIG. 7 is a view showing the details of the arm 5 and the roller block 11. In the figure, two conditions before and after the driving of the arm 5 are shown. As shown in FIGS. 4 and 7, the roller block 11 has a roller base 12. Two rollers 13 and 14 for restricting a peripheral edge part of the optical disk 10 inserted through the slot 2 and for cooperating with the rollers in the roller block 16 in loading the optical disk 10 while supporting a peripheral edge part of the optical disk 10 in the manner of clamping the peripheral edge part therebetween. The roller 13 can be rotated about a rotating shaft 13a; for the roller 14, the articulated shaft 14a functions also as a rotating shaft, whereby the roller 14 can be rotated about the articulated shaft 14a. In addition, the roller 13 and the roller 14 each have a structure in which a central part thereof is necked in an hourglass-like shape so that a peripheral edge part of the optical disk 10 can make contact therewith in the manner of being clamped in the necked part. This prevents the recording surface of the optical disk 10 from being marred.

The roller 13 and the roller 14 are provided respectively with a gear 13b and a gear 14b, and each of these gears is meshed with an idle gear 15 provided substantially at the center of the roller base 12. This ensures that the roller 13 and the roller 14 are rotated in conjunction with each other in the same phase and at an equal speed, so that the optical disk 10 can be conveyed smoothly. In addition, since the roller 13 and the roller 14 are connected by a single idle gear 15, load can be reduced as compared with the case of connection through a belt or the like, and a smoother conveying can be achieved.

Incidentally, as will be described later, a boss for releasing the optical disk 10 after loading so as to make the optical disk 10 rotatable is provided on the lower surface of the roller base 12.

Besides, as shown in FIG. 7, a belt 21 is provided on the rear side of and along the longitudinal direction of the arm 5. The belt 21 is wrapped around a pulley 61 and a pulley 62 provided at both end parts on the rear side of the arm 5. The pulley 61 and the pulley 62 are provided respectively with a gear 61a and a gear 62a, and the gear 61a is meshed with the gear 14b on the roller 14, while the gear 62a is meshed with a gear 22a of the loading motor 22. This ensures that upon the driving of the loading motor 22, the turning of the belt 21 is transmitted to each of the gears in the roller block 11, whereby the roller 13 and the roller 14 are rotated. The loading motor 22 is driven in forward and reverse directions at the times of loading and unloading of the optical disk 10, whereby the rollers 13 and 14 in the roller block 11 are also driven in respective forward and reverse directions.

The rotating shaft of the pulley 62 functions also as the turning shaft 5a of the arm 5. As above-mentioned, the arm 5 is turned in the direction of arrow A in the figure, about the turning shaft 5a; simultaneously, the roller block 11 is turned about the articulated shaft 14a, and is moved in the direction of arrow A in the figure while changing the angle between itself and the arm 5.

In addition, as shown in FIG. 4, like the roller block 11, the roller block 16 has two rollers 18 and 19, like the rollers 13 and 14 above, on a roller base 17. However, the rollers 18 and 19 are fixed so as not to be rotatable, and each of the rollers is not provided with any gear. When the arm 6 is turned in the direction of arrow B in the figure, the roller block 16 is moved in the direction of arrow B in the figure while changing the angle between itself and the arm 6, in symmetry with the roller block 11.

Thus, the roller blocks 11 and 16 and the arms 5 and 6 can be so turned as to be opened as the articulated shafts 14a and 14b are moved to the outer sides (in the directions of arrows A1 and B1 in FIG. 3).

Besides, as shown in FIGS. 4 and 7, in the roller block 11, the roller 14 is provided on the deeper side in the inserting direction of the optical disk 10 than the roller 13, and is connected to the arm 5 through the articulated shaft 14a as above-mentioned. Therefore, in the static condition of the disk drive system 100 (the condition where the optical disk 10 is not inserted), the roller 14 is located on the inner side (the side of A2 in the figure) of the disk drive system 100 than the roller 13 by the urging force of the coil spring 28. In addition, as shown in FIG. 4, in the roller block 16, the roller 19 is located on the inner side of the disk drive system 100 than the roller 18, in symmetry with the roller block 11. In the static condition of the disk drive system 100, the distance between the roller 13 and the roller 18 is smaller than the diameter of the large-diameter optical disk 10A of 12 cm and greater than the diameter of the small-diameter optical disk 10B of 8 cm. In addition, the distance between the roller 14 and the roller 19 is smaller than 8 cm. Due to this structure, the roller 13 is operated mainly at the time of loading the large-diameter optical disk 10A having a diameter of 12 cm, whereas the roller 14 is operated mainly at the time of loading the small-diameter optical disk 10B having a diameter of 8 cm. The details of these operations will be described later.

As shown in FIGS. 2 and 3, a guide groove 4a is provided on the roller block 11 side on the front side of the upper frame 4 of the loading unit 20, and the rotating shaft 13a is engaged in the guide groove 4a. Similarly, a guide groove 4b is provided on the roller block 16 side on the front side of the upper frame 4, and the rotating shaft 18a of the roller 18 is engaged in the guide groove 4b. By the guide groove 4a and the guide groove 4b, the rotating shaft 13a is guided in the directions of arrows C in these figures, and the rotating shaft 18a is guided in the directions of arrows D in these figures at the time of turning the arm 5 and 6. The roller block 11 and the roller block 16 are moved according to the motions of the rotating shaft 13a and the rotating shaft 18a guided by the guide grooves 4a and 4b, respectively. In addition, the lower surface of the roller base 12 of the roller block 11 is provided with a boss which can make contact with a boss provided on a main cam slider 35 (described later) at the time of releasing the loaded optical disk 10.

Incidentally, the roller bases and the gears in the roller block 11 and the roller block 16 are each formed, for example, of a resin, and the rollers are each formed by use of a blank material having a high frictional coefficient, such as rubber.

In such a configuration as above, when the disk 10 is inserted through the slot 2, the arm 5 and the arm 6 are turned in the direction A1 and the direction B1, the roller block 11 and the roller block 16 are moved; in addition, on one hand, the rollers 18 and 19 in the roller block 16 fix the disk 10, while on the other hand, the rollers 13 and 14 in the roller block 11 are rotated, whereby the optical disk 10 can be loaded and unloaded. Specifically, the loading unit 20 can load the disk 10 in the manner of rotating the disk 10 in a horizontal direction (counterclockwise at the time of loading, and clockwise at the time of unloading) by the roller 13 or the roller 14, with the fixed roller 18 or 19 as an axis of rotation.

As shown in FIG. 3, a non-contact type photo-sensor 72 for sensing that the optical disk 10 has been inserted by a distance in a predetermined range from the slot 2 at the time of loading the optical disk 10 and a substrate 71 connected to the photo-sensor 72 are provided substantially at the center on the front panel 1a side of the loading unit 20. The photo-sensor 72 is electrically connected to the loading motor 22, and, upon sensing the insertion of the optical disk 10, the driving of the loading motor 22 is started, and the rollers are rotated under control. The insertion of the optical disk 10 through the slot 2 is instantaneously sensed by the photo-sensor 72, whereby smooth loading can be achieved, without need for the user to push open the rollers and the arms.

Incidentally, the photo-sensor 72 may be of a reflection type wherein a light emitting part (light emitting diode) and a light receiving part (photo-diode) are provided at the same location, or of a transmission type wherein a light emitting part and a light receiving part are separately provided opposite to each other, with the optical disk 10 inserted therebetween. Besides, the sensor may not necessarily be a non-contact type sensor such as the photo-sensor but may be a contact type mechanical sensor (mechanical switch); however, the photo-sensor is preferred, taking into account the feeling of insertion of the disk 10.

In addition, a mechanical sensor 74 having a mechanical switch for stopping the driving of the roller block 11 at the time of discharging the large-diameter optical disk 10A and a mechanical sensor 75 for stopping the driving of the roller block 11 at the time of discharging the small-diameter optical disk 10B are provided in the vicinity of the roller block 11, and a substrate 73 connected to the mechanical sensors 74 and 75 is also provided. At the time of discharging the optical disk 10, the discharge amount is detected by the opening amount of the roller blocks 11 and 16. Therefore, mechanical sensors used exclusively and respectively for the different-sized optical disks, i.e., the large-diameter optical disk 10A and the small-diameter optical disk 10B are provided. The mechanical sensors 74 and 75 are also electrically connected to the loading motor 22, and the driving of the loading motor 22 is stopped when the large-diameter optical disk 10A or the small-diameter optical disk 10B is discharged by a predetermined amount and the roller block 11 has come into contact with the switch of the relevant sensor. This ensures that each of the large-diameter optical disk 10A and the small-diameter optical disk 10B can be discharged to an appropriate position permitting easy take-out of the disk by the user, without being discharged by an insufficient amount or being discharged by an excessively large amount so as to fly out from the slot 2.

Incidentally, the mechanical sensors 74 and 75 may naturally be replaced by non-contact type photo-sensors. However, a reduction in cost can be achieved by use of inexpensive mechanical sensors, since it is unnecessary to take the insertion feeling into account at the time of discharging the disk 10.

As shown in FIGS. 3 to 5, a pair of guide members 51a and 51b for guiding the disk 10 inserted through the slot 2 to the side of the roller block 11 and the roller block 16 and for preventing the penetration of dust into the disk drive system 100 are provided at an end part of the main frame 7, on the back side of the slot 2. The details of the guide members 51 will be described later.

As shown in FIGS. 2 to 4, a disk clamp 9 for restricting the inclination of the optical disk 10 inserted through the slot 2 and for pressing from above the optical disk 10 at the time of chucking of the optical disk 10 to a chucking part (described later) so as to permit a smooth chucking operation is provided at the upper frame 4 of the loading unit 20. The disk clamp 9 incorporates a magnet (not shown) for applying a clamping force for clamping the optical disk 10.

As shown in FIGS. 4 and 5, a rear guide 23 is provided between the upper frame 4 and the lower frame 8 of the loading unit 20. The rear guide 23 waits on the depth side in the insertion direction for the optical disk 10 inserted through the slot 2, and guides the optical disk 10 further in the insertion direction while supporting the optical disk 10 in the vertical direction.

To be more specific, as shown in FIG. 5, the rear guide 23 has hourglass-like disk support parts 27a and 27b for supporting the disk 10 in the vertical direction, and guide shafts 24 and 25 provided to project in the vertical direction. Besides, as shown in FIGS. 2 and 3, the upper frame 4 is provided on the rear side thereof with a guide groove 4c directed in the insertion direction of the disk 10, and the guide shaft 24 and the guide shaft 25 of the rear guide 23 are slidably engaged with the guide groove 4c. This ensures that the guide shaft 24 and the guide shaft 25 are guided by the guide groove 25, whereby the rear guide 23 can be slid in the directions of arrows E in FIGS. 2 and 3.

In addition, a rear guide arm 29 is provided on the back side of the upper frame 4. The rear guide arm 29 can be turned horizontally about a rotating shaft 29b, and is provided in its tip with an engaging part 29a which can be moved in conjunction with rear guide 23 while being in engagement with the guide shaft 24 of the rear guide 23. Besides, the rear guide arm 29 has a coil spring 29c, one end of which is connected to the back surface of the upper frame 4 and the other end of which is connected to the rear guide arm 29. By the coil spring 29c, the rear guide arm 29 and the rear guide 23 are urged in the direction of arrow E2 in these figures. As will be detailed later, the rear guide 23 can slide in the direction of arrow E1 in these figures against the spring force of the coil spring 29c while supporting the optical disk 10 by the disk support parts 27a and 27b when the optical disk 10 is inserted.

Furthermore, a rear cam slider 32 is provided on the lower frame 8 on the lower side of the rear guide arm 29. The rear cam slider 32 will be described in detail later. Incidentally, the rear guide 23, the rear guide arm 29 and the rear cam slider 32 are each formed of a resin, for example.

Figure 6:
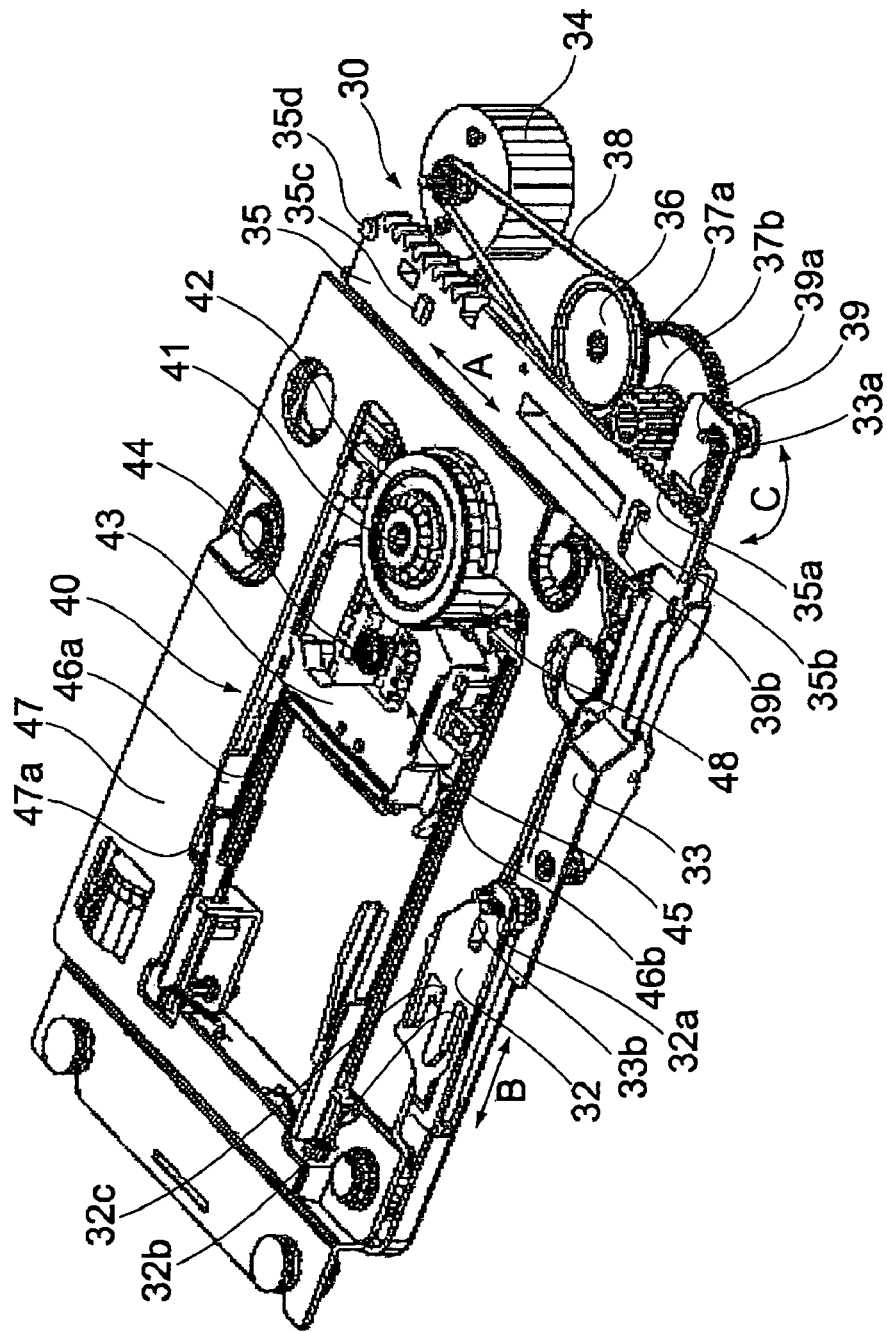
FIG. 6 is a view showing a pickup unit and a lift mechanism in one embodiment of the present invention.

FIG. 6 is a view showing a pickup unit provided on the lower side of the loading unit 20 inside the main frame 7 and a lift mechanism for moving the pickup unit in the vertical direction.

The pickup unit 40 is a unit for recording or reproduction of signals on the optical disk 10. As shown in FIGS. 5 and 6, the pickup unit 40 has a base frame 47 formed, for example, of a thin sheet metal. A chucking part 41 for chucking the optical disk 10 and a turntable 42 for holding the chucked optical disk 10 are provided on the front side on the base frame 47. A spindle motor 48 for rotatingly driving the turntable 42 and the disk 10 as one body is provided on the lower side of the turntable 42.

In addition, a pickup mechanism 45 is provided at an opening part 47a provided substantially at the center of the base frame 47. The pickup mechanism 45 has a pickup base 43. The pickup base 43 holds an optical block in which a light beam emitted from a semiconductor laser (not shown) serving as a light source is condensed by an objective lens 44 to irradiate a signal recording surface of the optical disk 10 therewith, and the returning light beam having been reflected by the signal recording surface is detected by a photo-detector including as a light receiving element and the like.

Besides, the pickup mechanism 45 has such elements as a two-axis actuator for displacingly driving the objective lens 44 in an optical axis direction (called the focusing direction) and the direction orthogonal to a record track of the optical disk 10 (called the tracking direction). While displacing the objective lens 44 in the focusing direction and the tracking direction by the two-axis actuator based on a detection signal from the optical disk 10 detected by the photo-detector, such drive controls as focusing servo of adjusting the focus of the objective lens 44 onto the signal recording surface of the optical disk 10, tracking servo of causing the spot of the light beam condensed by the objective lens 44 to follow up to the record track, etc. are performed. Incidentally, as a mechanism for driving the objective lens 44, there may be used a three-axis actuator which enables adjustment of the inclination (skew) of the objective lens 44 against the signal recording surface of the optical disk 10 so that the light beam condensed by the objective lens 44 is radiated perpendicularly to the signal recording surface of the optical disk 10, in addition to the focusing control and the tracking control.

In addition, the pickup base 43 is supported by a pair of guide shafts 46a and 46b so as to be slidable in the radial direction of the optical disk 10, and is displacingly driven inside the opening part 47a in the radial direction of the disk 10, by the guide shafts, a displacement driving motor (not shown), and a thread feeding mechanism such as gears.

Incidentally, as shown in FIGS. 4 and 5, the lower frame 8 of the loading unit 20 is provided with an opening part 8a for causing the chucking part 41, the turntable 42, the pickup mechanism 45 and the like of the pickup unit 40 to front on the loading unit 20 side at the time of lifting up or down.

Besides, as shown in FIGS. 4 and 5, the rear guide 23 of the loading unit 20 has the disk support parts 27a and 27b arranged so as to be astride the pickup mechanism 45, and is slid with a large stroke in directions (the directions of arrows E in FIG. 3) parallel to the displacing driving directions of the pickup base 43. This ensures that the rear guide 23 can support and convey the optical disk 10 with high stability, notwithstanding its simple structure. Therefore, the need for an auxiliary disk guide for supporting the optical disk 10 between the roller blocks and the rear guide is eliminated, and a reduction in cost can be contrived while enhancing reliability. This, in turn, makes it possible to efficiently dispose the rear guide 23 between the upper frame 4 and the lower frame 8 of the loading unit 20, while assuredly preventing the interference between the rear guide 23 and the pickup mechanism 45, and the disk drive system 100 can thereby be made to have a half-height size.

The pickup unit 40 configured as above can be lifted up and down (chuck-up and chuck-down) by a lift mechanism 30 shown in FIG. 6, at the time of chucking the disk 10 onto the chucking part 41. By the lifting up and down, the disk drive system 100 can be switched between a loading mode for loading the optical disk 10 and a recording/reproduction mode for performing recording/reproduction of signals on the optical disk 10.

As shown in FIG. 6, the lift mechanism 30 has a main cam slider 35 connected to the pickup unit 40, a rear cam slider 32 operating in conjunction with the main cam slider 35, a connecting slider 33 and a connecting arm 39 for connecting the main cam slider 35 and the rear cam slider 32 to each other for the conjunction, a cam motor 34, various gears and the like. The main cam slider 35 is formed of, for example, a resin, while the connecting slider 33 and the connecting arm 39 are each formed of, for example, a metal.

The main cam slider 35 is provided with a rack 35a, and a small-diameter gear 37b of a slide gear 37 is meshed with the rack 35a. A large-diameter gear 37a of the slide gear 37 is in mesh with a gear formed at a lower part of a pulley 36. One end of a belt 38 is wrapped around the pulley 36, and the other end of the belt 38 is wrapped around a pulley provided at an upper part of the cam motor 34. This ensures that a driving force of the cam motor 34 is transmitted to the pulley 36 and the slide gear 37, whereby the main cam slider 35 can be slid in directions (the directions of arrows A in the figure) substantially parallel to the front panel 1a of the disk drive system 100.

Figure 8:
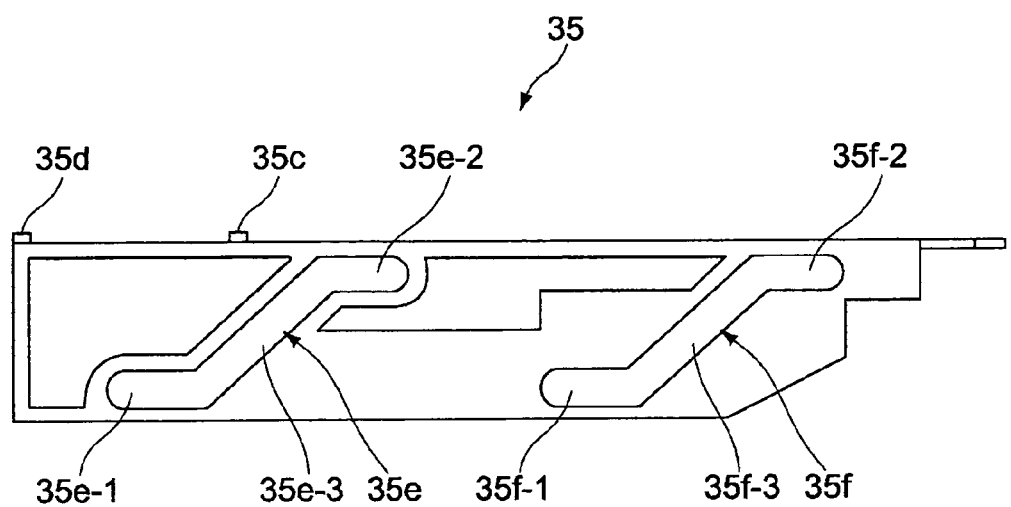
FIG. 8 is a view showing a side surface, on the pickup unit side, of a main cam slider in one embodiment of the present invention.

FIG. 8 is a view showing a side surface, on the pickup unit 40 side, of the main cam slider 35. As shown in the figure, a side surface of the main cam slider 35 is provided with two cam grooves 35e and 35f. The cam grooves 35e and 35f has horizontal parts 35e-1 and 35f-1 on the lower side, horizontal parts 35e-2 and 35f-2 on the upper side, and inclined parts 35e-3 and 35f-3 connecting the horizontal parts to each other, respectively. Two bosses (not shown) provided on the side surface of the pickup unit 40 are slidably engaged in the cam grooves 35e and 35f.

Besides, as shown in FIG. 6, the slide gear 37 is provided with an L-shaped connecting arm 39 (only an end part thereof is shown in the figure). The connecting arm 39 can be turned in the directions of arrows C in the figure. In addition, the connecting arm 39 is provided at both end parts thereof with a pin 39a and a pin 39b which project in the vertical direction. The pin 39a is engaged in a guide groove 33a formed at one end in the longitudinal direction of the connecting slider 33, while the pin 39b is engaged in a cam groove 35b formed in the main can slider 35.

As shown in FIGS. 5 and 6, the connecting slider 33 is provided at its other end with a pin 33b projecting in the vertical direction. The pin 33b is engaged with an engaging hole 32a in the rear cam slider 32 through the lower frame 8. The rear cam slider 32 is engaged with a cam slit (not shown) provided in the lower frame 8 along the directions of arrows B in FIG. 6, whereby it can be slid in the directions of arrows B.

With this configuration, as the main cam slider 35 is slid in the direction of arrow A by the driving of the cam motor 34, the connecting arm 39 is turned in the direction of arrow C, the connecting slider 33 engaged with the connecting arm 39 is slid in the direction of arrow B, and, further, the rear cam slider 32 engaged with the connecting slider 33 can also be slid in the direction of arrow B.

When the main cam slider 35 is slid, the pickup unit 40 is guided by the cam grooves 35e and 35f formed in the side surface of the main cam slider 35 as shown in FIG. 8, whereby the pickup unit 40 is lifted up or down. When the disk drive system 100 is in the loading mode, the bosses on the side surface of the pickup unit 40 are located in the horizontal parts 35e-1 and 35f-1 on the lower side of the cam grooves 35e and 35f, and when the disk drive system 100 is in the recording/reproduction mode, the bosses are moved up along the inclined parts 35e-3 and 35f-3, to be located in the horizontal parts 35e-2 and 35f-2 on the upper side.

In addition, as shown in FIG. 5, the rear guide arm 29 is provided on the upper side of the rear cam slider 32. Besides, as shown in FIG. 6, the upper surface of the rear guide arm 29 is provided with two cam grooves 32b and 32c. The lower surface of the rear guide arm 29 is provided with a bosse capable of engagement with the cam grooves 32b and 32c. With the rear cam slider 32 slid, the bosses are slid in the cam groove 32b or 32c, whereby the rear guide arm 29 and the rear guide 23 engaged with the rear guide arm 29 can be slid in the direction of arrow B in the figure. As will be detailed later, by this sliding motion, it is possible to release the optical disk 10 guided to the depth side in the insertion direction of the disk drive system 100 by the rear guide 23, and to permit the rotation of the optical disk 10 at the time of recording/reproduction on the optical disk 10.

Besides, as shown in FIG. 6, the upper surface of the main cam slider 35 is provided with two bosses 35c and 35d. As will be detailed later, at the time of the sliding motion of the main cam slider 35, the bosses 35c and 35d abut on and push the bosses provided on the lower surface of the roller base 12 of the roller block 11, whereby the optical disk 10 can be released.

Specifically, the main cam slider 35 and the rear cam slider 32, by their sliding motions, release the optical disk 10 after loading, thereby enabling recording/reproduction on the optical disk 10.

Figure 9:
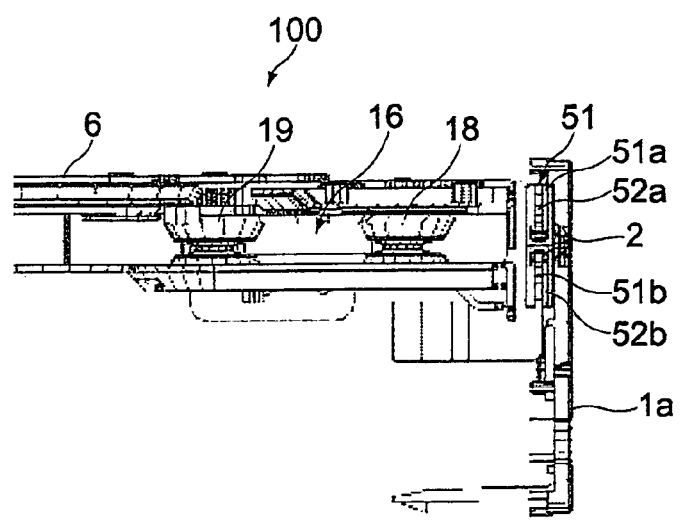
FIG. 9 is a sectional view showing the vicinity of a slot of the disk drive system in a first embodiment of the present invention.

Now, guide members 51 provided on the back side of the slot 2 will be described in detail below. FIG. 9 is a sectional view, as viewed from a side surface side, of the vicinity of the slot 2 in the disk drive system 100, and FIG. 10 is an enlarged sectional view of the slot 2 and the guide members 51 shown in FIG. 9.

As shown in these figures and FIGS. 3 to 5, the plate-like guide members 51 for guiding the inserted optical disk 10 to the side of the roller block 11 and the roller block 16 are provided at an end part of the main frame 7, on the back side of the slot 2. Two guide members 51 (a guide member 51a and a guide member 51b) are provided to be opposed to each other in the vertical direction of the slot 2. A sheet-formed member 52a and a sheet-formed member 52b are held on both surfaces of each of the guide members 51a and 51b, by adhesion, for example.

Figure 10:
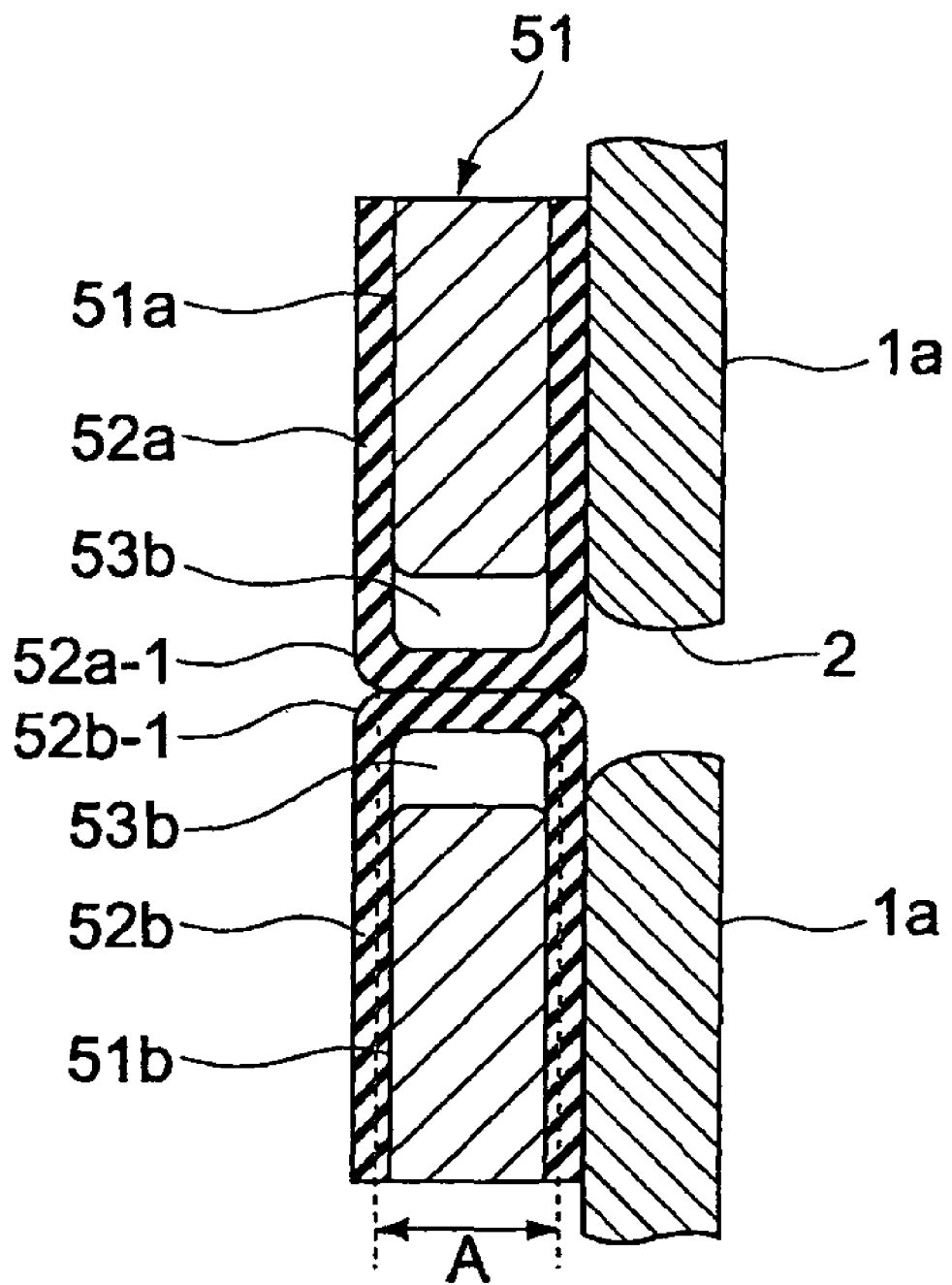
FIG. 10 is an enlarged sectional view of the slot and a guide member shown in FIG. 9, as viewed from the side surface side.

As shown in FIG. 10, the sheet-formed members 52a and 52b are formed of a flexible material such as a non-woven fabric. An artificial leather, a felt or the like may be used in place of the non-woven fabric. The sheet-formed members 52a and 52b have respective deflected parts 52a-1 and 52b-1 deflected in loop forms at their end parts on the slot 2 side, and the deflected parts 52a-1 and 52b-1 are so provided as to face each other in the vertical direction and to make contact with each other. The deflected parts 52a-1 and 52b-1 are formed by utilizing the thickness of the guide members 51a and 51b. Inside the deflected parts 52a-1 and 52b-1, voids 53a and 53b are formed to be surrounded by principal surfaces, on the side of adhesion to the guide members 51a and 51b, of the sheet-formed members 52a and 52b and end parts of the guide members 51a and 51b, respectively.

This makes it possible to enlarge the area of contact of the sheet-formed members in the insertion direction of the optical disk 10 (arrow A in the figure), without raising the contact pressure between the sheet-formed members. Therefore, as the area of contact is enlarged, compared with the case where a sheet-formed member provided with a slit, for example, is provided in the vertical direction near the slot in parallel to the front panel as in the related art or the case where two sheet-formed members are provided vertically so as to slightly overlap with each other as in the related art. In addition, the generation of a gap due to secular change of sheet-formed member can be prevented, so that dust-proofness can be remarkably enhanced.

Incidentally, the guide members 51a and 51b are detachably attached to the main frame 7. This can enhance the workability in the manufacturing process such as adhesion of the sheet-formed members 52a and 52b.

Now, operations of the disk drive system 100 configured as above will be described below.

Figure 11A:
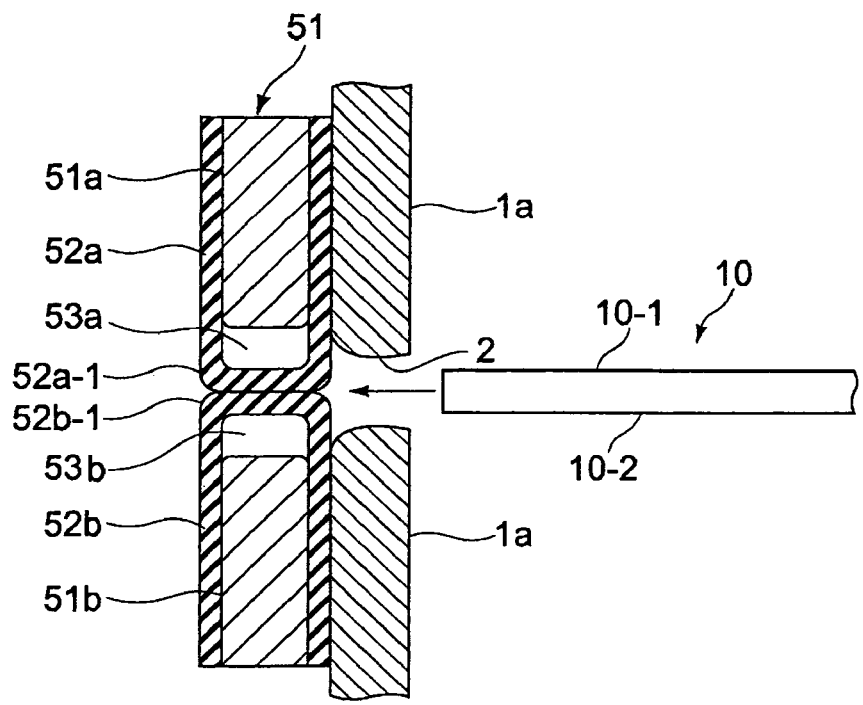
FIGS. 11A and 11B are views showing the manners of the vicinity of the slot before and after the insertion of an optical disk, in one embodiment of the present invention.
Figure 11B:
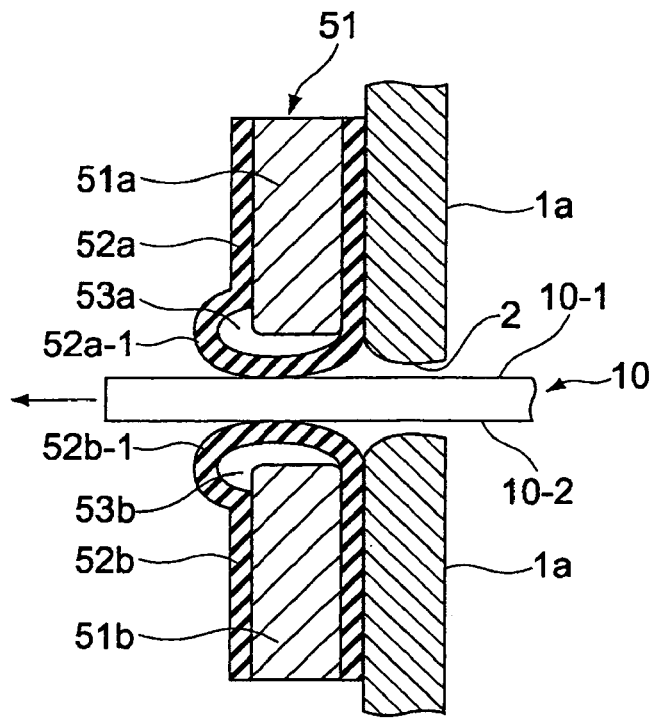

First, the operation at the time of inserting the optical disk 10 through the slot 2 will be described. FIGS. 11A and 11B are views showing the manners of the vicinity of the slot 2 before and after insertion of the optical disk 10. FIG. 11A shows the manner before insertion, and FIG. 11B shows the manner after insertion.

As shown in FIG. 11A, in the condition where the optical disk 10 is not inserted, the deflected parts 52a-1 and 52b-1 of the sheet-formed members 52a and 52b provided on the guide members 51a and 51b make close contact with each other, whereby dust-proofness is secured.

In the case of inserting the optical disk 10 as shown in FIG. 11B, the deflected parts 52a-1 and 52b-1 are deformed so as to overhang in the insertion direction of the optical disk 10 (so that the voids 53a and 53b are collapsed), and concurrently with the deformation, the deflected part 52a-1 makes contact with the opposite surface 10-1 opposite to the recording surface 10-2 of the optical disk 10, whereas the deflected part 52b-1 makes contact with the recording surface 10-2. While keeping the contact, the deflected parts 52a-1 and 52b-1 guide the optical disk 10 in the insertion direction. After the optical disk 10 is passed through the slot 2 and the sheet-formed members 52a and 52b (the guide members 51a and 51b), the condition of FIG. 11A is again obtained. Incidentally, through not shown, also at the time of discharging the optical disk 10, the deflected parts 52a-1 and 52b-1 guide the optical disk 10 in the discharging direction while being deformed so as to overhang in the discharging direction.

This makes it possible to constantly maintaining the dust-proofness before and after the insertion and discharge of the optical disk 10. In addition, since the deflected parts 52a-1 and 52b-1 make contact with each other over a wide area under their deflection forces, the wide contact area can be maintained by the deflection forces and the dust-proofness can be maintained, even when the insertion and discharge of the optical disk 10 are repeated.

Now, the operations from the loading of the optical disk 10 inserted through the slot 2 to the release of the optical disk 10 will be described below, separately for the case of a 12 cm large-diameter optical disk 10A and the case of an 8 cm small-diameter optical disk 10B.

First, the operations from the loading of the large-diameter optical disk 10A to the release of the optical disk 10A will be described.

Figure 12:
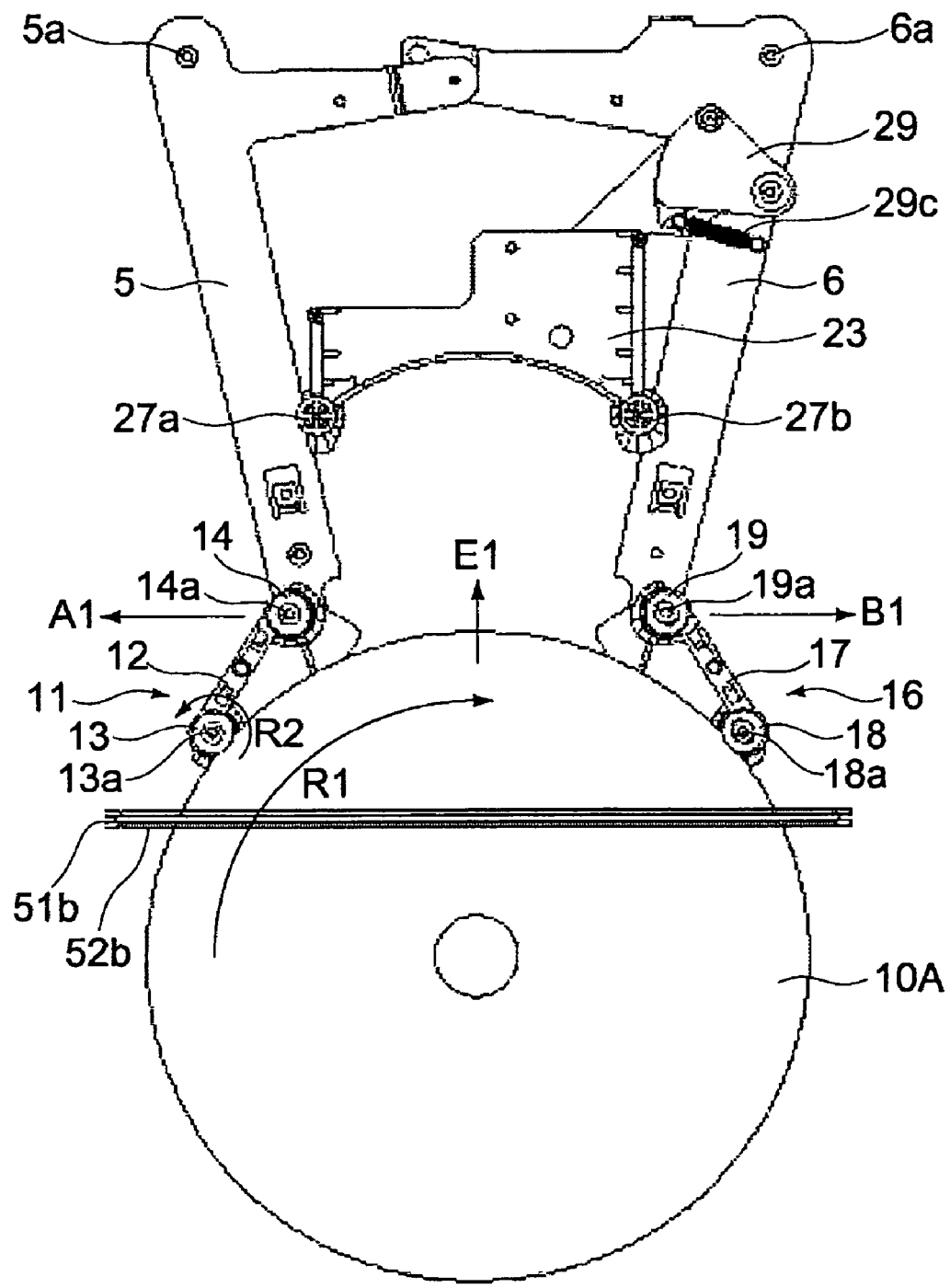
FIG. 12 is a view showing the manner of the loading unit in the condition a little after the insertion of a large-diameter optical disk, in one embodiment of the present invention.
Figure 13:
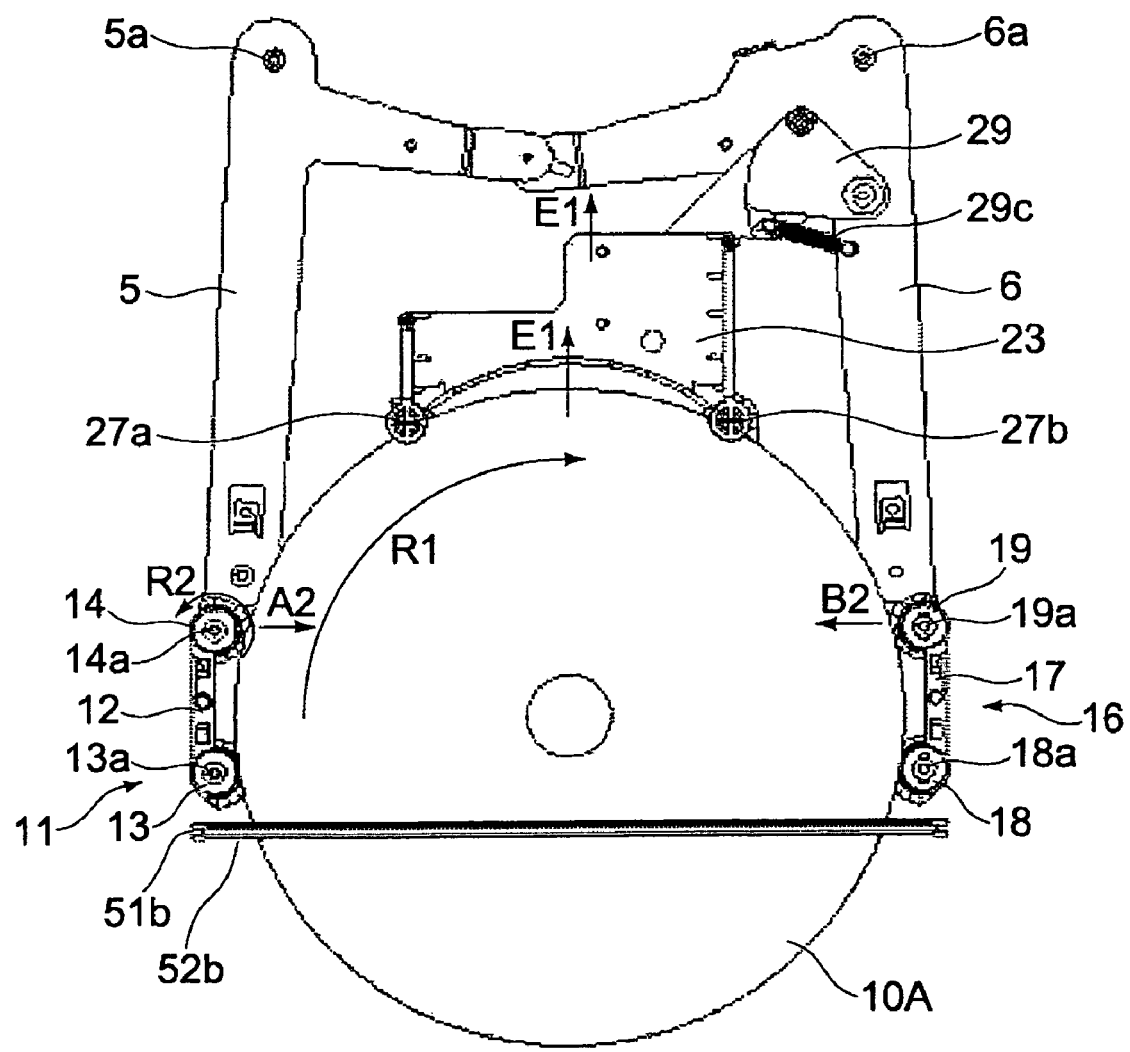
FIG. 13 is a view showing the manner of the loading unit in the course of conveying the large-diameter optical disk, in one embodiment of the present invention.
Figure 14:
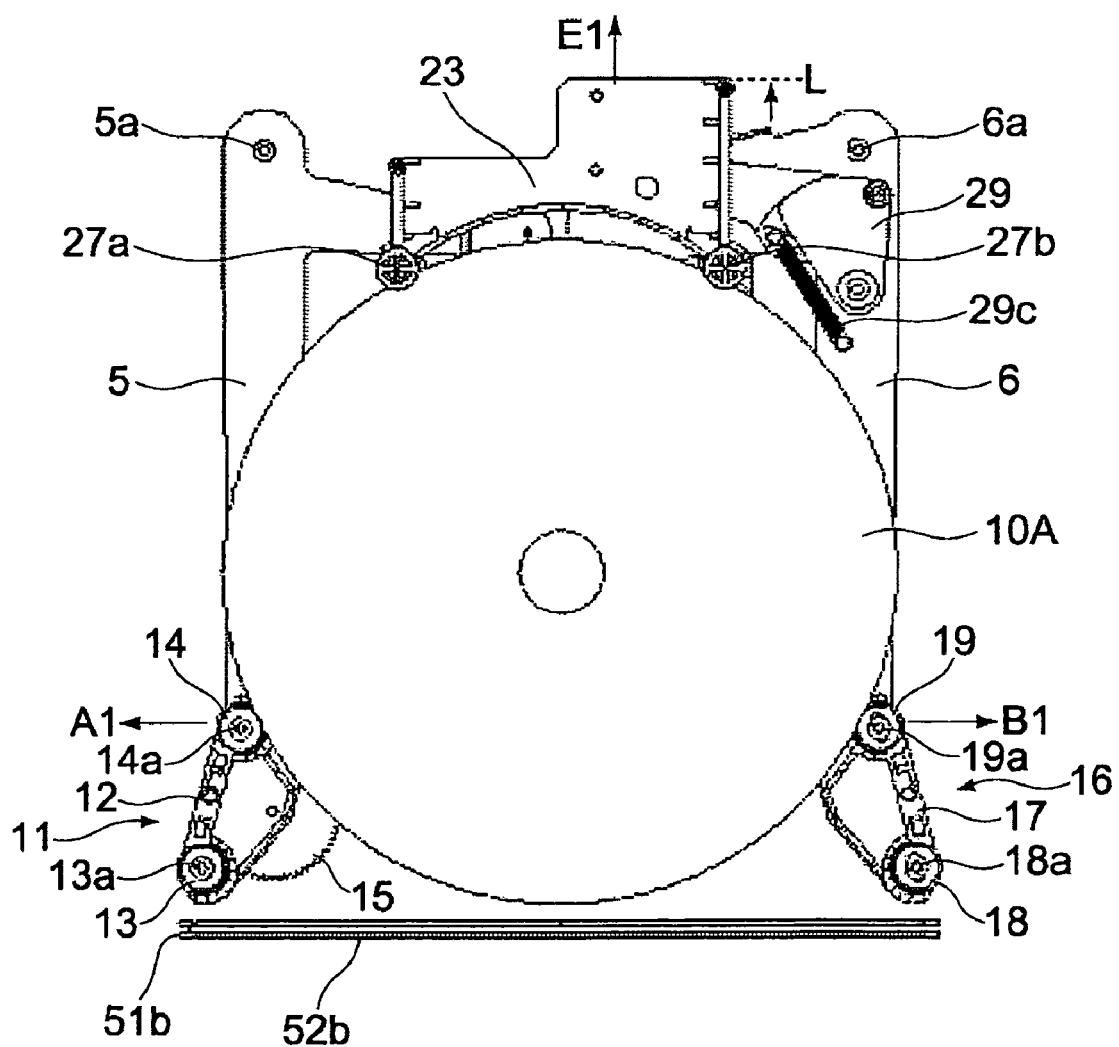
FIG. 14 is a view showing the manner of the loading unit at the time of centering the large-diameter optical disk, in one embodiment of the present invention.
Figure 15:
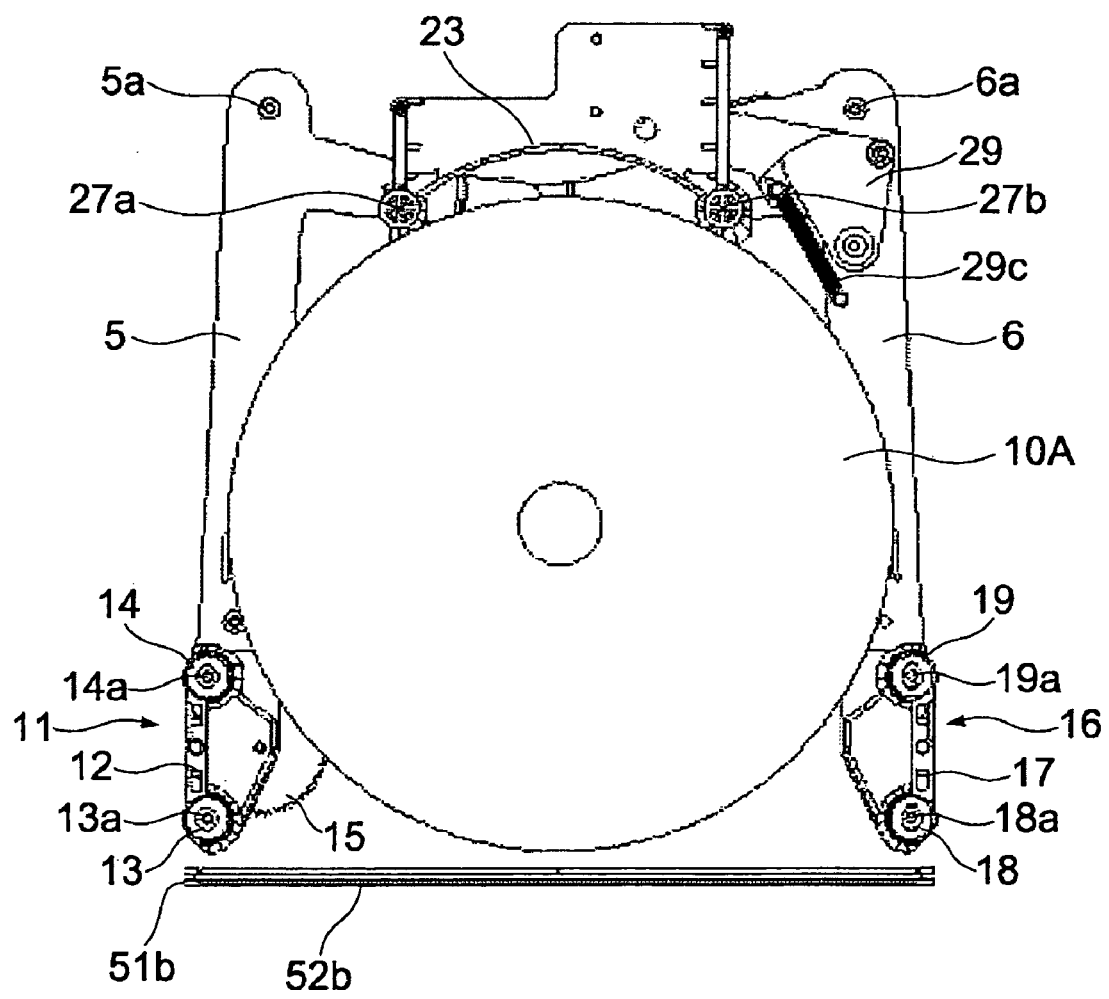
FIG. 15 is a view showing the manner of the loading unit at the time of releasing the large-diameter optical disk, in one embodiment of the present invention.

FIG. 12 shows the manner of the loading unit 20 in the condition a little after the insertion of the large-diameter optical disk 10A, FIG. 13 shows the manner of the loading unit 20 in the course of conveying the large-diameter optical disk 10A, FIG. 14 shows the manner of the loading unit 20 at the time of centering the large-diameter optical disk 10A, and FIG. 15 shows the manner of the loading unit 20 at the time of releasing the centered large-diameter optical disk 10A, as viewed from the lower surface side of the disk drive system 100. Incidentally, in each of the figures, only the parts, necessary for description of each operation, of the component parts of the disk drive system 100 will be described.

As shown in FIG. 12, the roller blocks 11 and 16 of the loading unit 20 are in the stand-by state in which they are located on the inner side relative to the rollers 14 and 19 on the depth side in the insertion direction and the rollers 13 and 18 on the viewer's side. When the large-diameter optical disk 10 is inserted through the slot 2 and the insertion is sensed by the photo-sensor 72 shown in FIG. 3, the driving of the loading motor 22 is started, whereby the rollers 13 and 14 of the roller block 11 start rotating in the direction of arrow R2 in FIG. 12 (clockwise as viewed from the upper side).

Then, when a peripheral edge part of the large-diameter optical disk 10 make contact with the outer-side rollers 13 and 18 of the roller blocks 11 and 16, the large-diameter optical disk 10A having its peripheral edge part fixed on one side by the roller 18 is rotated in the direction of arrow R1 in the figure (counterclockwise as viewed from the upper side), with the fixed peripheral edge part as an axis, by the rotation of the roller 13, whereby the optical disk 10 is conveyed toward the depth side in the insertion direction (the direction of arrow E1 in the figure). In this case, the arms 5 and 6 are turned toward the outer sides (in the direction of arrow A1 and the direction of arrow B1 in the figure, with the turning shafts 5a and 6a as respective axes; simultaneously, the roller blocks 11 and 16 are moved in an opening manner while turning in the direction of arrow A1 and the direction of arrow B1 in the figure, with the articulated shafts 14a and 19a as respective axes.

Subsequently, when the arms 5 and 6 and the roller blocks 11 and 16 have become substantially parallel to each other and about ⅔ portion of the principal surface of the large-diameter optical disk 10A has passed by the guide member 51 (the sheet-formed member 52) as shown in FIG. 13, a peripheral edge part of the large-diameter optical disk 10A abut on the disk support parts 27a and 27b of the rear guide 23 in the manner of being clamped between the disk support parts 27a and 27b, and, while being guided by the sliding motion of the rear guide 23 in the direction of arrow E1 in the figure, it is conveyed further toward the depth side (in the direction of arrow E1). In this case, in the roller blocks 11 and 16, the roller 14 and the roller 19 in place of the roller 13 and the roller 18 abut on peripheral edge parts of the large-diameter optical disk 10A, and the large-diameter optical disk 10A is conveyed in the direction of arrow E1 in the figure while being rotated in the direction of arrow R1, with its peripheral edge part abutting on the roller 19 as an axis, by the rotation of the roller 14 in the direction of arrow R2 in the figure. Attendant on the conveying, the rollers 14 and 19 are moved in the directions of arrow A2 and arrow B2 in the figure. With the structure in which the arms 5 and 6 and the roller blocks 11 and 16 are provided in such an articulated form so that they are opened to the outermost sides at the time of conveying the optical disk 10, the disk drive system 100 can be reduced to the half-height size in the width direction (in the directions of arrows A and B in FIGS. 12 and 13).

Then, when the large-diameter optical disk 10A has passed completely by the guide member 51 and has been conveyed to a position of the limit of the rearward sliding of the rear guide 23 as shown in FIG. 14 (the position of L in the figure), the roller 14 starts rotating idly. In the disk drive system 100, this position is set as a centering position for the large-diameter optical disk 10A, and the driving of the loading motor 22 and the rotation of the rollers 13 and 14 are stopped. The driving of the loading motor 22 is stopped, for example, at a time when a predetermined period of time, for example, 2 to 3 sec, has passed from the start of the driving and when the idle rotation of the roller 14 has been detected. For example, the driving may be stopped by sensing the position where the sliding motion of the rear guide 23 is stopped (the position L).

When the large-diameter optical disk 10A is centered, the disk drive system 100 releases the large-diameter optical disk 10A for the purpose of rotating the large-diameter optical disk 10A by the spindle motor 48 in recording/reproduction of signals on the large-diameter optical disk 10A. Specifically, in FIG. 14, the position of the large-diameter optical disk 10A is kept as it is, the rollers 14 and 19 supporting the large-diameter optical disk 10A are moved in the directions of arrow A1 and arrow B1 in the figure, and the disk support parts 27a and 27b of the rear guide 23 are moved in the direction of arrow E1 in the figure. As a result of this, as shown in FIG. 15, clearances such as to permit the rotation of the large-diameter optical disk 10A are formed between the rollers 14 and 19 and between the disk support parts 27a and 27b.

Here, the releasing operation will be described more in detail. FIGS. 16A and 16B are views showing the manners of the rear guide 23, the rear guide arm 29, the rear cam slider 32 and the connecting slider 33 before and after release of the large-diameter optical disk 10A. FIG. 16A shows the manner before the release, and FIG. 16B shows the manner after the release.

As above-mentioned, the rear cam slider 32 is connected to the main cam slider 35 shown in FIG. 16 through the connecting arm 39 and the connecting slider 33. In addition, the upper surface of the rear cam slider 32 is provided with two cam grooves 32c and 32d, and the boss 29d provided on the lower surface of the rear guide arm 29 can be engaged with the cam grooves 32c and 32d.

Upon detecting the completion of the centering of the large-diameter optical disk 10A, the disk drive system 100 starts the driving of the cam motor 34 shown in FIG. 6. By the driving of the cam motor 34, starting from the condition before release of the large-diameter optical disk 10A shown in FIG. 16A, the main cam slider 35 is slid and, attendantly, the connecting slider 33 and the rear cam slider 32 are slid in the direction of arrow A in the figure, whereon the boss 29d of the rear guide arm 29 is moved in the direction of arrow C in the figure while being guided by the cam groove 32b of the rear cam slider 32. Attendant on this, the rear guide arm 29 is moved in the direction of arrow B in the figure, with the turning shaft 29b as a center. By this, the guide shaft 24 of the rear guide 23 in engagement with the engaging part 29a of the rear guide arm 29 is moved, whereby the rear guide 23 is slightly moved in the direction of arrow D in the figure. As a result of these operations, as shown in FIG. 16B, the depth side in the insertion direction of the peripheral edge part of the large-diameter optical disk 10A is released from the rear guide 23, and a clearance is formed between the disk support portions 27a and 27b of the rear guide 23 and the large-diameter optical disk 10A.

FIGS. 17A and 17B are views showing the manners of the arms 5 and 6, the roller blocks 11 and 16, and the main cam slider 35 before and after release of the large-diameter optical disk 10A, as viewed from the upper side of the disk drive system 100; and FIGS. 18A and 18B are perspective views of parts of the arm 5, the roller block 11, the main cam slider 35 and the pickup unit 40 before and after release of the large-diameter optical disk 10A, as viewed from a side surface side of the disk drive system 100. FIGS. 17A and 18A show the manner before the release, and FIGS. 17B and 18B show the manner after the release.

As above-mentioned, the upper surface of the main cam slider 35 is provided with the boss 35c and the boss 35d, and the lower surface of the roller base 12 of the roller block 11 is provided with the boss 12a.

When the main cam slider 35 is slid in the direction of arrow A in FIGS. 17A and 18A by driving of the cam motor 34 starting from the condition of FIGS. 17A and 18A, the boss 35d of the main cam slider 35 pushes the boss 12a of the roller block 11, whereby the roller block 11 is also moved toward the outer side (in the direction of arrow A), and the roller block 16 connected to the roller block 11 through the arms 5 and 6 is also moved toward the outer side (in the direction of arrow B). As a result of this, as shown in FIGS. 17B and 18B, the viewer's side in the insertion direction of a peripheral edge part of the large-diameter optical disk 10A is released from the roller 14 and the roller 19, whereby a clearance is formed between the rollers 14 and 19 and the large-diameter optical disk 10A.

By the operations of the rear cam slider 32 and the main cam slider 35 as above, the large-diameter optical disk 10A is released and put into a rotatable condition.

Now, the operations from the loading of the small-diameter optical disk 10B to the release of the small-diameter optical disk 10B will be described below.

Figure 19:
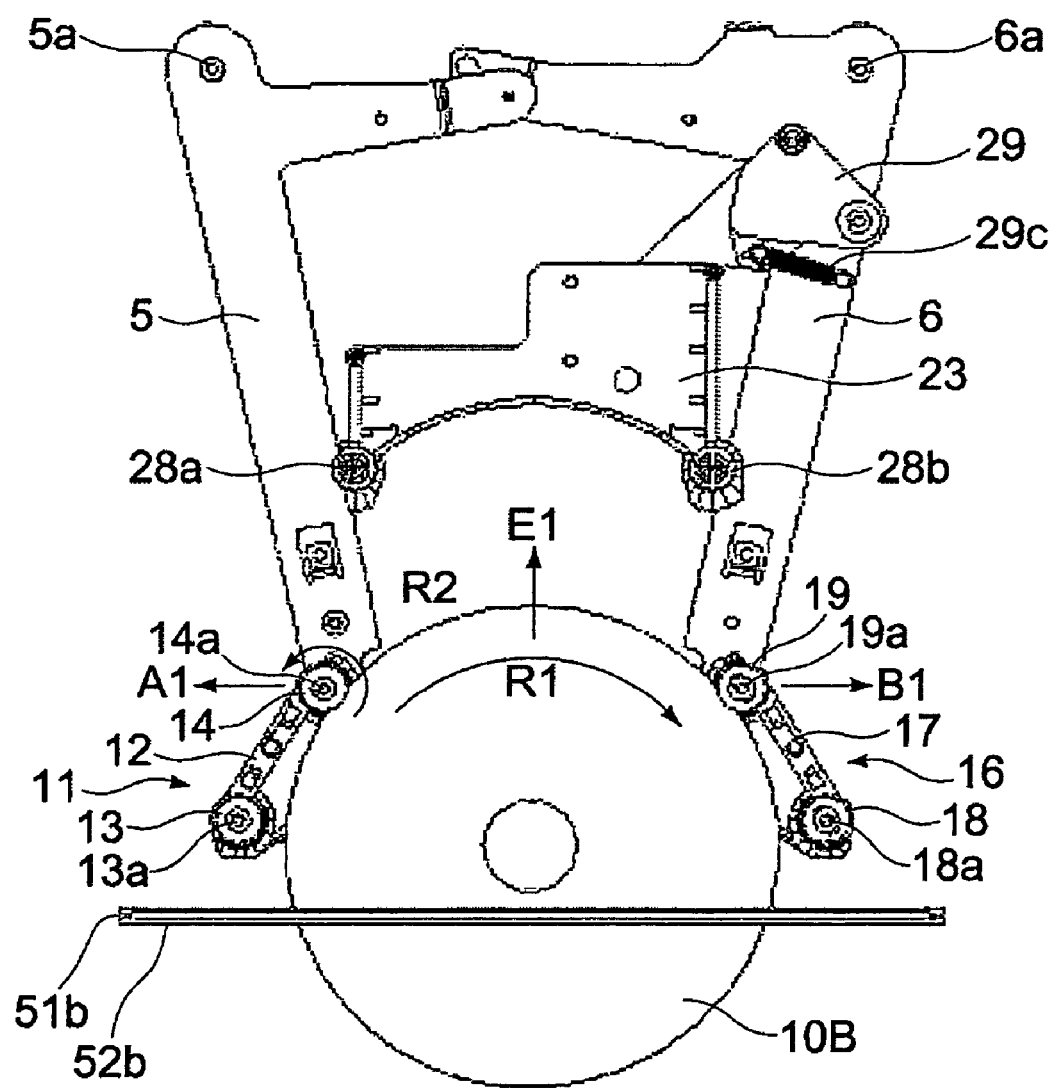
FIG. 19 is a view showing the manner of the loading unit in the condition a little after the insertion of a small-diameter optical disk, in one embodiment of the present invention.
Figure 20:
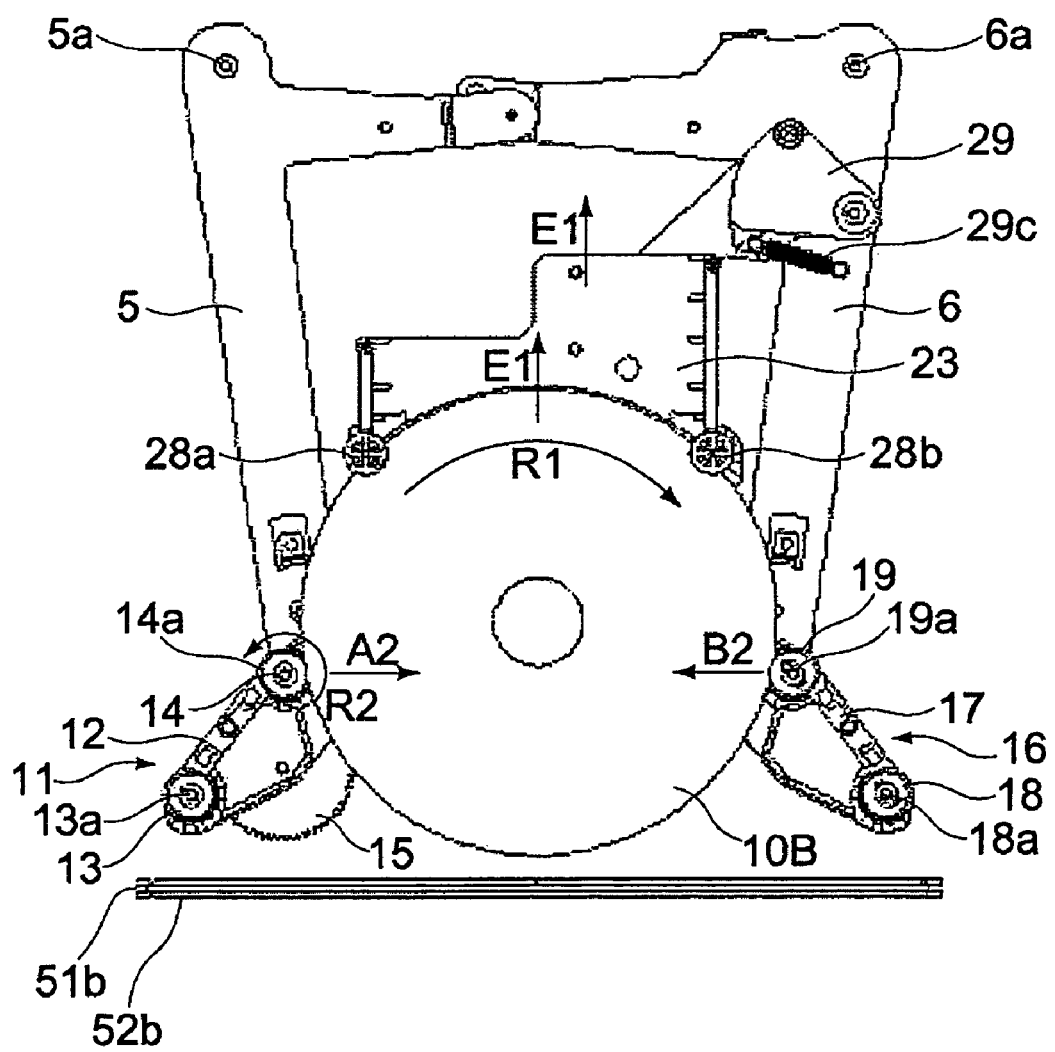
FIG. 20 is a view showing the manner of the loading unit in the course of conveying of the small-diameter optical disk, in one embodiment of the present invention.
Figure 21:
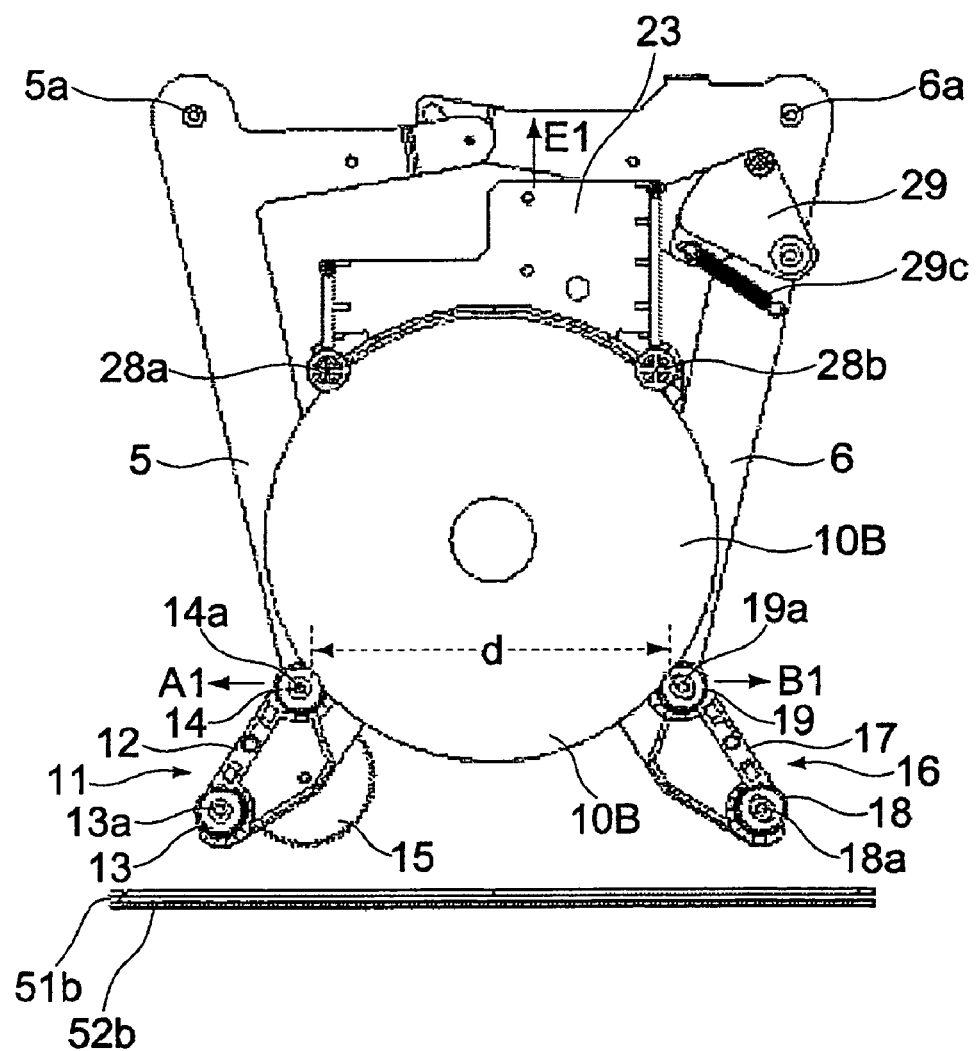
FIG. 21 is a view showing the manner of the loading unit at the time of centering the small-diameter optical disk, in one embodiment of the present invention.
Figure 22:
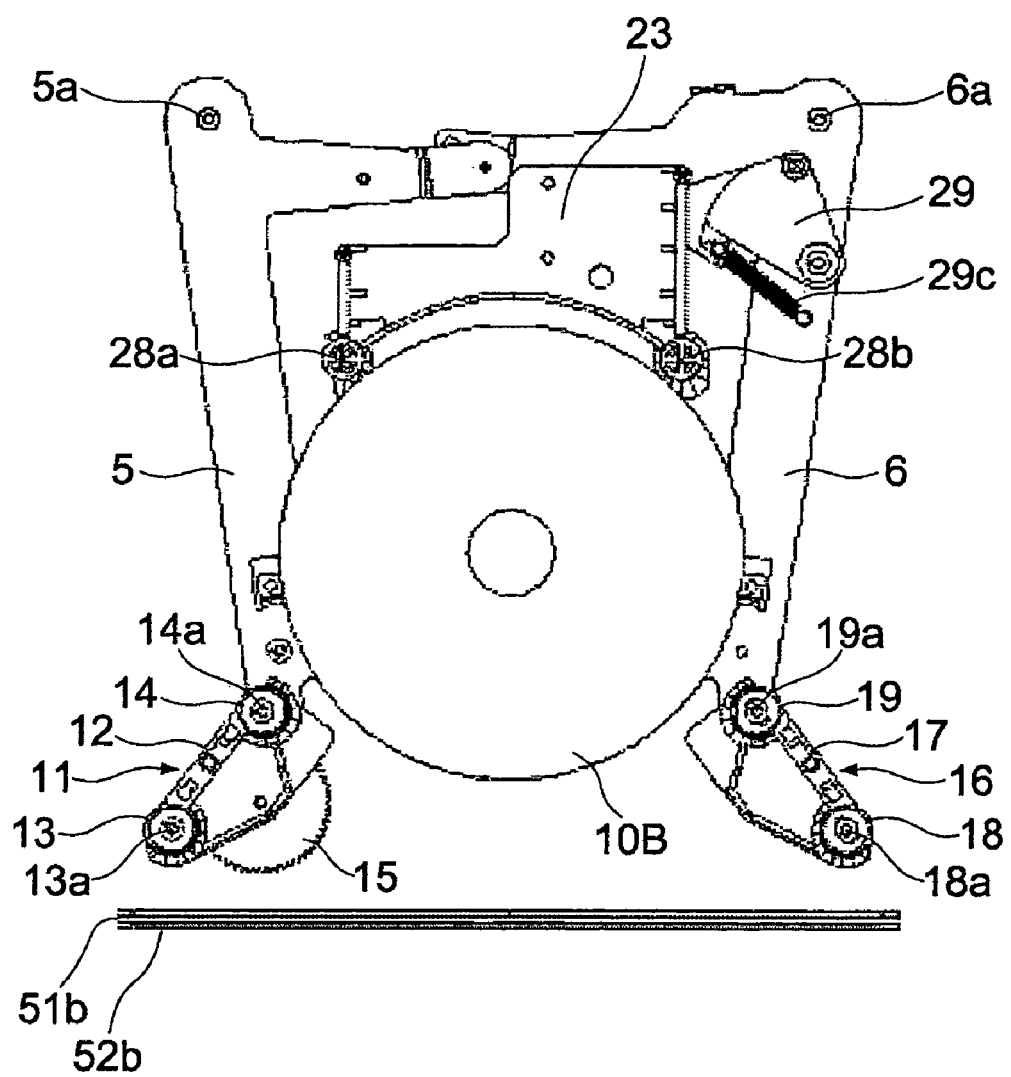
FIG. 22 is a view showing the manner of the loading unit at the time of releasing the centered small-diameter optical disk, in one embodiment of the present invention.

FIG. 19 shows the manner of the loading unit 20 in the condition a little after the insertion of the small-diameter optical disk 10B, FIG. 20 shows the manner of the loading unit 20 in the course of conveying of the small-diameter optical disk 10B, FIG. 21 shows the manner of the loading unit 20 at the time of centering the small-diameter optical disk 10B, and FIG. 22 shows the manner of the loading unit 20 at the time of releasing the centered small-diameter optical disk 10B, as viewed from the lower side of the disk drive system 100. Incidentally, descriptions of the parts of which the operations are the same as in the case of the large-diameter optical disk 10A above will be omitted or simplified.

When the small-diameter optical disk 10B is inserted through the slot 2 as shown in FIG. 19 and the insertion is sensed by the photo-sensor 72, the rollers 13 and 14 in the roller block 11 start rotating in the arrow R2 in the figure. Then, when a peripheral edge part of the small-diameter optical disk 10B makes contact with the rollers 14 and 19 on the inner side, the small-diameter optical disk 10B having its peripheral edge part on one side fixed by the roller 19 is turned in the direction of arrow R1 in the figure, with the fixed peripheral edge part as an axis, by the rotation of the roller 14, whereby it is conveyed toward the depth side in the insertion direction (in the direction of arrow E1 in the figure). In this case, the arms 5 and 6 are turned to the respective outer sides (in the directions of arrows A1 and B1 in the figure), and, attendant on this, the roller blocks 11 and 16 are also moved while being turned in the directions of arrows A1 and B1 in the figure.

Subsequently, when the small-diameter optical disk 10B has completely passed by the guide member 51 (the sheet-formed member 52) as shown in FIG. 20, a peripheral edge part of the small-diameter optical disk 10B abuts on the disk support parts 27a and 27b of the rear guide 23 in the manner of being clamped between the disk support parts 27a and 27b, and the small-diameter optical disk 10B is conveyed further toward the depth side (in the direction of arrow E1) by the rear guide 23. Attendant on the conveying, the rollers 14 and 19 are moved in the directions of arrows A2 and B2 in the figure.

Then, when the small-diameter optical disk 10B is further conveyed by the rear guide 23 as shown in FIG. 21, the roller 14 and the roller 19 are located at the same positions as those of the roller 14 and the roller 19 in the static condition of the disk drive system 100. In other words, the distance d between the roller 14 and the roller 19 in the static condition and the distance between two points of the peripheral edge part of the small-diameter optical disk 10B making contact with the rollers 14 and 19 are roughly equal to each other. As a result, the roller 14 and the roller 19 can no longer clamp the small-diameter optical disk 10B therebetween, so that the roller 14 starts rotating idly. The disk drive system 100 sets this position as a centering position for the small-diameter optical disk 10B, and stops the driving of the loading motor 22 and the rotation of the rollers 13 and 14.

When the small-diameter optical disk 10B is centered, the disk drive system 100 releases the small-diameter optical disk 10B for recording/reproduction of signals on the small-diameter optical disk 10B, in the same manner as in the case of the large-diameter optical disk 10A. Specifically, in FIG. 21, while the position of the small-diameter optical disk 10B as it is, the roller 14 and the roller 19 making contact with the small-diameter optical disk 10B are moved in the directions of arrows A1 and B1 in the figure, and the disk support parts 27a and 27b of the rear guide 23 are moved in the direction of arrow E1 in the figure. As a result, clearances such as to permit the rotation of the small-diameter optical disk 10B are formed between the small-diameter optical disk 10B and the rollers 14, 19 and the disk support parts 27a, 27b, as shown in FIG. 22.

Here, the releasing operation will be described more in detail below. FIGS. 23A and 23B are views showing the manners of the rear guide 23, the rear guide arm 29, the rear cam slider 32 and the connecting slider 33 before and after release of the small-diameter optical disk 10B. FIG. 23A shows the manner before the release, and FIG. 23B shows the manner after the release.

Upon detecting the completion of centering of the small-diameter optical disk 10B, the disk drive system 100 starts driving of the cam motor 34. By the driving of the cam motor 34, the rear cam slider 32 is slid in the direction of arrow A in FIG. 23A starting from the condition before release of the small-diameter optical disk 10B shown in the figure, whereon the boss 29d of the rear guide arm 29 is moved in the direction of arrow C in the figure while being guided by the cam groove 32c in the rear cam slider 32. Attendant on this, the rear guide arm 29 is moved in the direction of arrow B in the figure. As a result of this, the guide shaft 24 of the rear guide 23 is moved, whereby the rear guide 23 is slightly moved in the direction of arrow D in the figure. By these operations, the depth side in the insertion direction of the peripheral edge part of the small-diameter optical disk 10B is released from the rear guide 23 as shown in FIG. 23B, and a clearance is formed between the disk support parts 27a and 27b of the rear guide 23 and the small-diameter optical disk 10B.

Figure 24A:
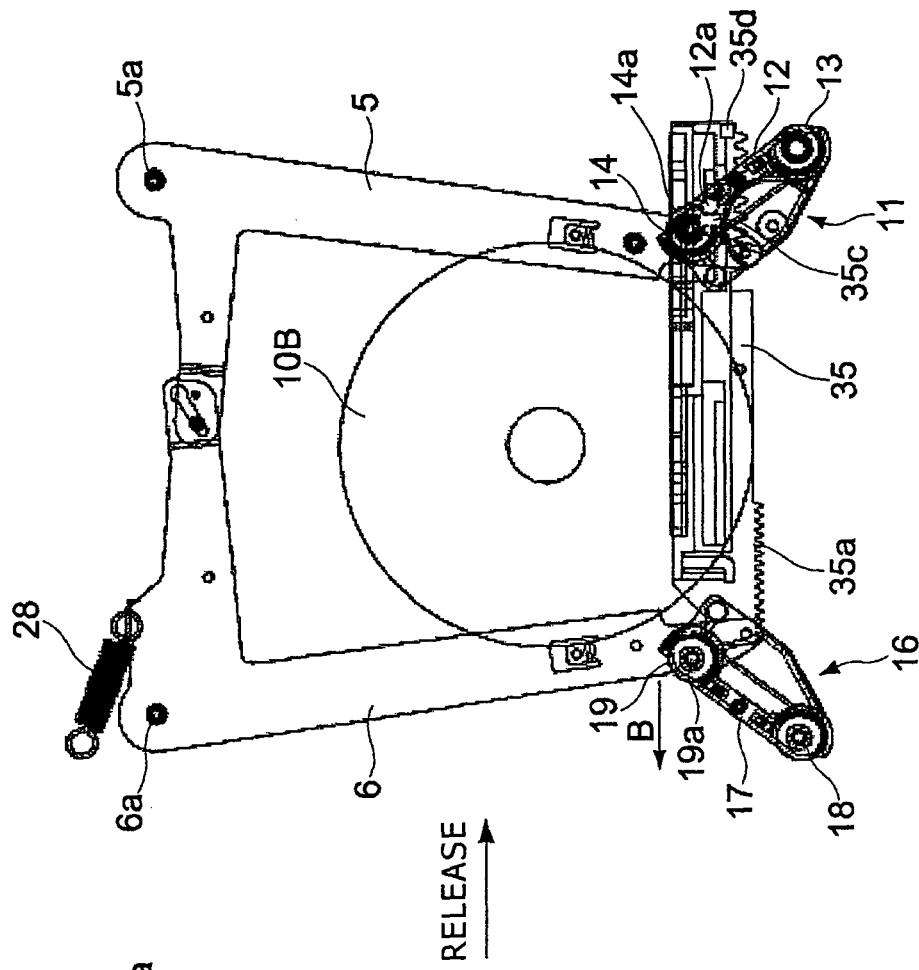
FIGS. 24A and 24B are views, as viewed from the upper side of the disk drive system, of the manners of the arms, the roller blocks, and the main cam slider before and after releasing the small-diameter optical disk, in one embodiment of the present invention.
Figure 24B:
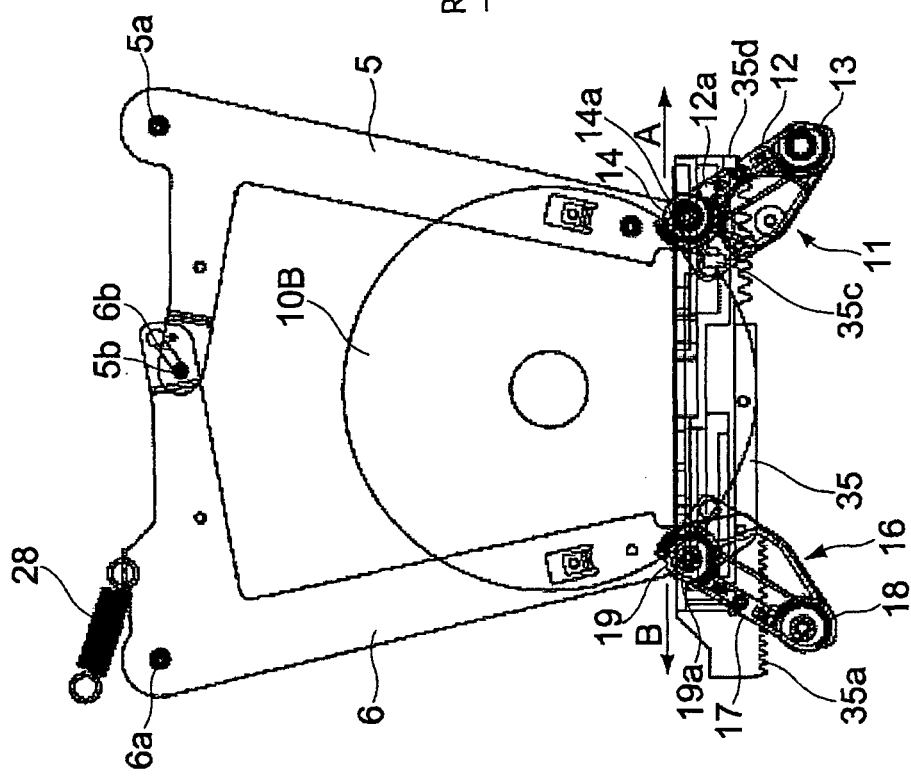
Figure 25A:
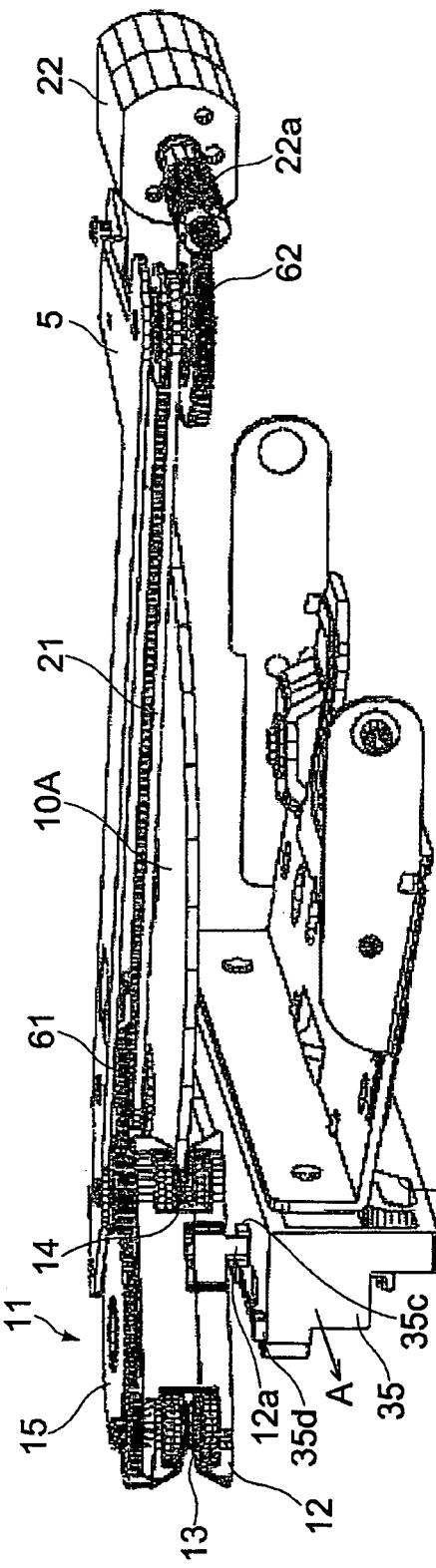
FIGS. 25A and 25B are views, as viewed from a side surface of the disk drive system, of a part of the arm, the roller block, the main cam slider and the pickup unit before and after releasing the small-diameter optical disk, in one embodiment of the present invention.
Figure 25B:
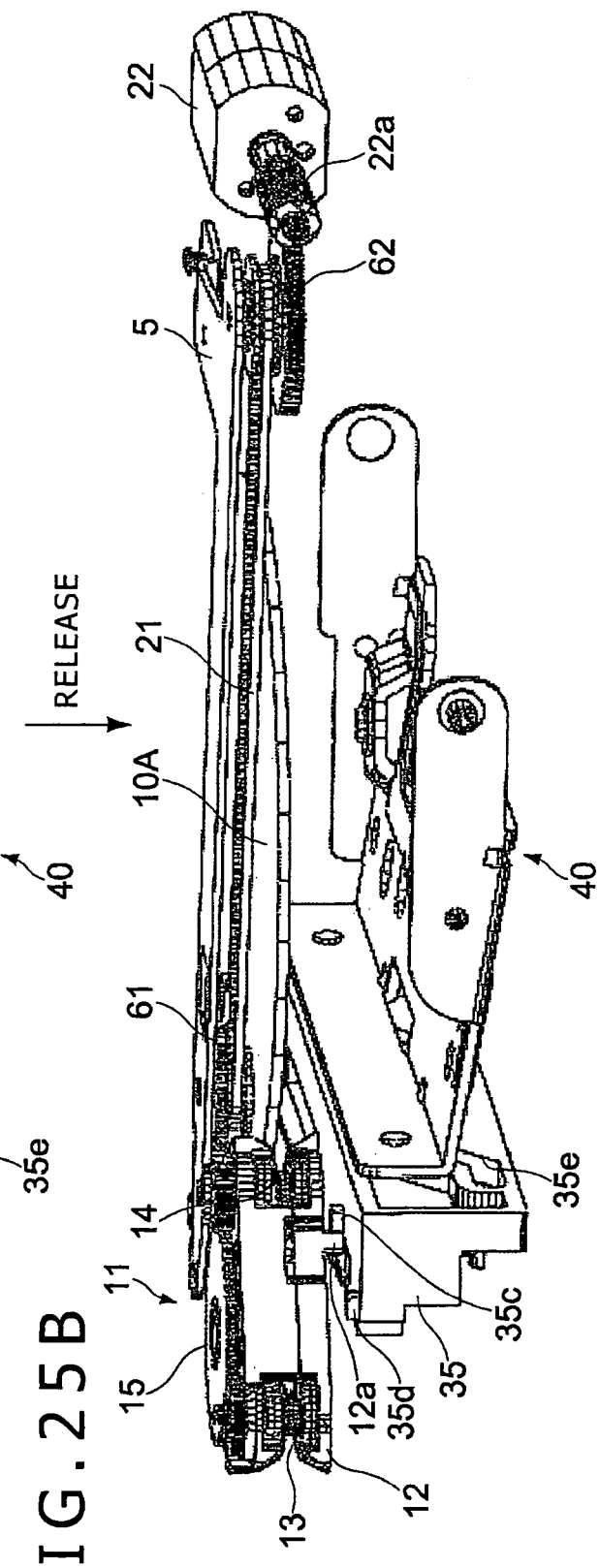

FIGS. 24A and 24B are views showing the manners of the arms 5 and 6, the roller blocks 11 and 16, and the main cam slider 35 before and after release of the small-diameter optical disk 10B, and FIGS. 25A and 25B are perspective views of parts of the arm 5, the roller block 11, the main cam slider 35 and the pickup unit 40 before and after release of the small-diameter optical disk 10B, as viewed from a side surface side of the disk drive system 100. FIG. 24A and 25A show the condition before the release, and FIGS. 24B and 25B show the condition after the release.

When the main cam slider 35 is slid in the direction of arrow A in FIGS. 17A and 18A by the driving of the cam motor 34 starting from the condition shown in FIGS. 24A and 25A, the boss 35c of the main cam slider 35 pushes the boss 12a of the roller block 11, whereby the roller block 11 is also moved toward the outer side (in the direction of arrow A), and the roller block 16 is also moved toward the outer side (in the direction of arrow B). By this, the viewer's side in the insertion direction of the peripheral edge part of the small-diameter optical disk 10B is released from the roller 14 and the roller 19, whereby a clearance is formed between the rollers 14, 19 and the small-diameter optical disk 10B.

By the operations of the rear cam slider 32 and the main cam slider 35 as above-mentioned, the small-diameter optical disk 10B is released and put into a rotatable condition.

By making the centering method and the releasing method different for the large-diameter optical disk 10A and for the small-diameter optical disk 10B, it is possible to simplify the cam mechanism, to suppress an increase in the number of component parts and to reduce cost, as compared with the case where cam mechanisms are provided respectively for the different-sized optical disks. In addition, this produces a spatial margin in the disk drive system 100, so that it is easy to divert component parts of tray type disk drive systems which are common and inexpensive, whereby a further reduction in cost can be promised. The slot-in type disk drive systems such as the disk drive system 100 in this embodiment have had the demerit of a comparatively high manufacturing cost. However, by alleviating the demerit, it is possible to make the most of the merit of the slot-in type, such as good feeling of insertion, a smaller number of operating steps, etc.

Figure 26A:
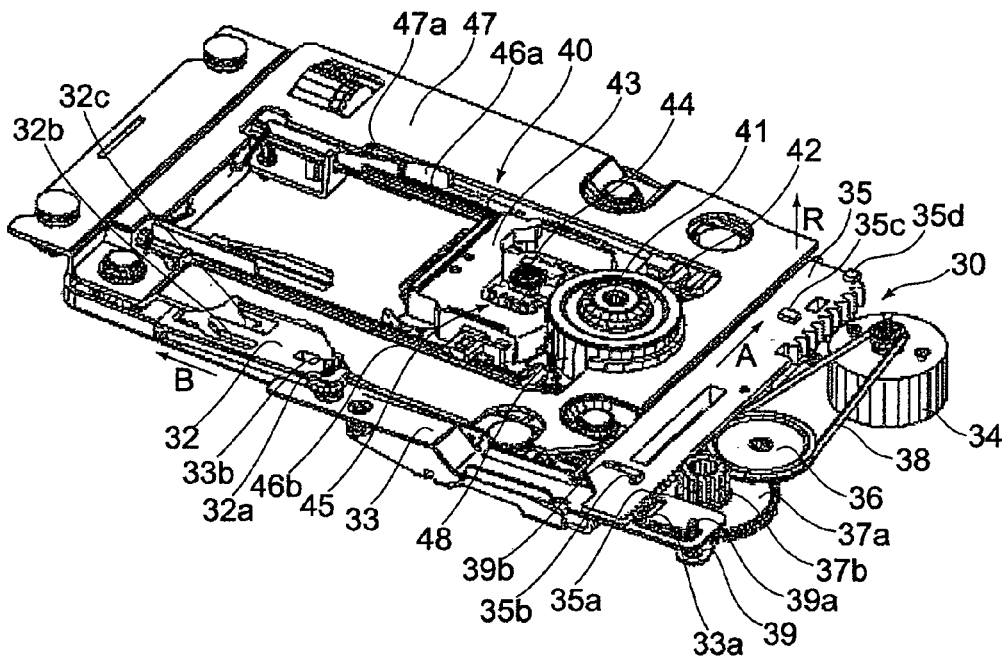
FIGS. 26A and 26B are views showing the manners of the lift mechanism and the pickup unit before and after chucking the large-diameter optical disk and the small-diameter optical disk, in one embodiment of the present invention.
Figure 26B:
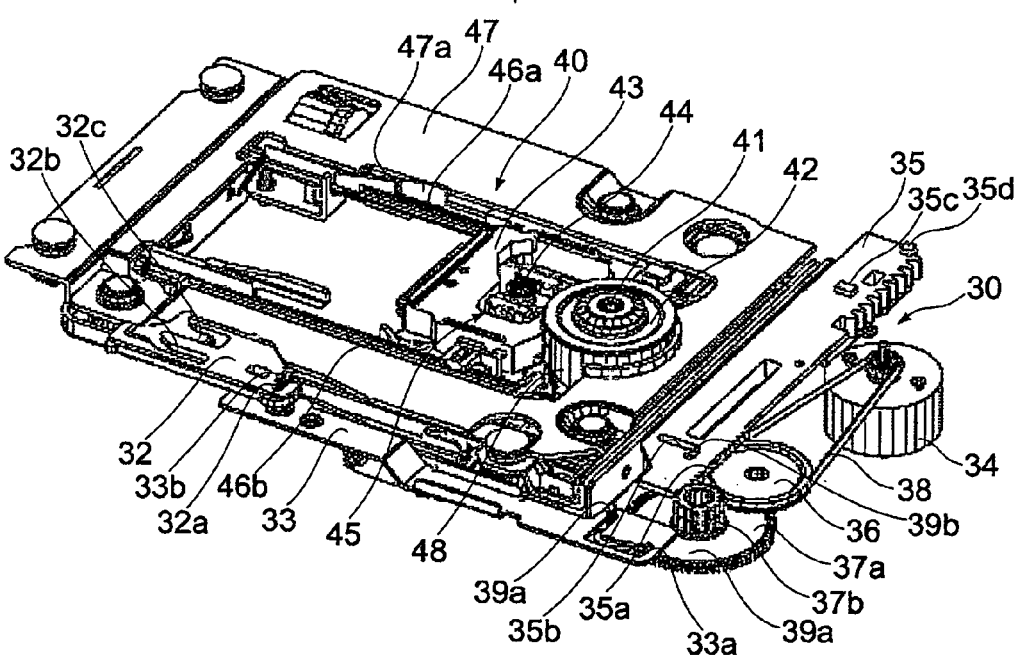

Besides, in the disk drive system 100, a chucking operation is also performed concurrently with the releasing operation. The chucking operation will now be described below. FIGS. 26A and 26B are views showing the manners of the lift mechanism 30 and the pickup unit 40 before and after chucking of the optical disk 10. FIG. 26A shows the manner before the chucking, and FIG. 26B shows the manner after the chucking.

In the condition before chucking of the optical disk 10 as shown in FIG. 26A, the two bosses provided on a side surface of the pickup unit 40 are in engagement with the lower-side horizontal parts 35e-1 and 35f-1 of the two cam grooves 35e and 35f in a side surface of the main cam slider 35, as shown in FIG. 6.

Starting from this condition, the main cam slider 35 is slid in the direction of arrow A in FIG. 26A by driving of the cam motor 34, whereon the bosses on the side surface of the pickup unit 40 are moved from the horizontal parts 35e-1 and 35f-1 to the upper-side horizontal parts 35e-2 and 35f-2 through the inclined parts 35e-3 and 35f-3 while being guided by the cam grooves 35e and 35f. By this operation, the pickup unit 40 is moved up in the vertical direction (in the direction of arrow R in FIG. 26A), into the chuck-up condition as shown in FIG. 26B. In this case, the chucking part 41 of the pickup unit 40 cooperates with a disk clamp 9 provided at the upper frame 4 of the loading unit 20 in chucking the optical disk 10 at its center hole. With the chucking operation completed, the optical disk 10 is in such a condition that it can be rotated by the spindle motor 48 and recording/reproduction of signals on the optical disk 10 can be performed.

Now, the operations at the time of discharging the chucked optical disk 10 through the slot 2 will be described.

When the eject button 3 provided on the front panel 1a of the casing 1 is depressed by the user in the condition where the optical disk is in the recording/reproduction mode, the disk drive system 100 stops the rotation of the optical disk 10 by the spindle motor 48, and chucks down the optical disk 10. The chucking-down operation is reversed to the chucking-up operation. Specifically, the cam motor 34 is driven reversely to that at the time of chucking-up, whereby the cam slider 35 is slid in the direction reverse to that at the time of chucking-up. By this, the bosses on the side surface of the pickup unit 40 which have been located in the upper-side horizontal parts 35e-2 and 35f-2 of the cam grooves 35e and 35f are guided to the lower-side horizontal parts 35e-1 and 35f-1, whereby the pickup unit 40 is lowered. As a result, the optical disk 10 is released from the chucking part 41. Besides, attendant on the lowering operation, the release of the optical disk 10 is canceled by the sliding motions of the main cam slider 35 and the rear cam slider 32, and the optical disk 10 is supported at the centering position by the rollers 14, 19 of the roller blocks 11, 16 and the disk support parts 27a, 27b of the rear guide 23.

When completion of the chucking-down is detected, the disk drive system 100 drives the loading motor 22 in the direction reverse to that at the time of loading, whereby the arms 5, 6 and the roller blocks 11, 16 are driven in the directions reverse to those at the time of loading. By this, the optical disk 10 is conveyed in the discharging direction.

When the mechanical sensor 74 or 75 shown in FIG. 3 senses the discharge amount of the large-diameter optical disk 10A or the small-diameter optical disk 10B and senses that the arms 5, 6 and the roller blocks 11, 16 have been closed to predetermined positions and that the optical disk 10 has been discharged to a predetermined position, the driving of the loading motor 22 is stopped, thereby stopping the conveying of the optical disk 10. As a result, the optical disk 10 is discharged to such a position that it can be easily taken out by the user through the guide members 51 (the sheet-formed members 52) and the slot 2.

Incidentally, the present invention is not limited to the above-described embodiment, and various modifications can naturally be made within the scope of the gist of the invention.

For example, various modifications can also be made as to the configurations of the guide member 51 and the sheet-formed member on the back side of the slot 2. Now, the modified examples will be described below.

Figure 27:
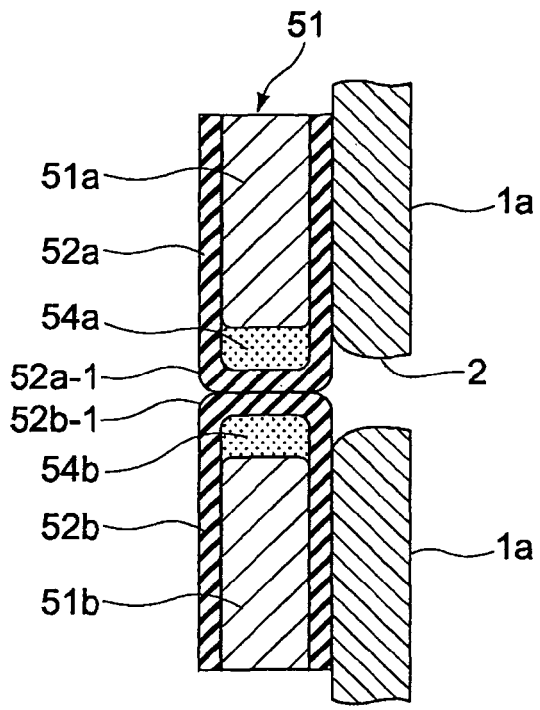
FIG. 27 is a view showing a first modified example of a guide member and a sheet-formed member, in one embodiment of the present invention.

FIG. 27 is a view showing a first modified example of the guide members 51 and the sheet-formed members 52. While the voids 53a and 53b have been provided in the deflected parts 52a-1 and 52b-1 of the sheet-formed members 52a and 52b in the above-described embodiment, the interiors of the deflected parts 52a-1 and 52b-2 may be filled with a soft material 54a, 54b, as shown in the figure.

As the soft material 54a, 54b, for example, a foamed material such as sponge is used. As a result, the deflected parts 52a-1 and 52b-1 are increased in elasticity and strength, so that the contact pressure between the deflected parts and the optical disk 10 can be increased. In addition, since generation of gap between the sheet-formed members 52a, 52b and the slot 2 can be prevented, dust-proofness can be further enhanced.

Figure 28:
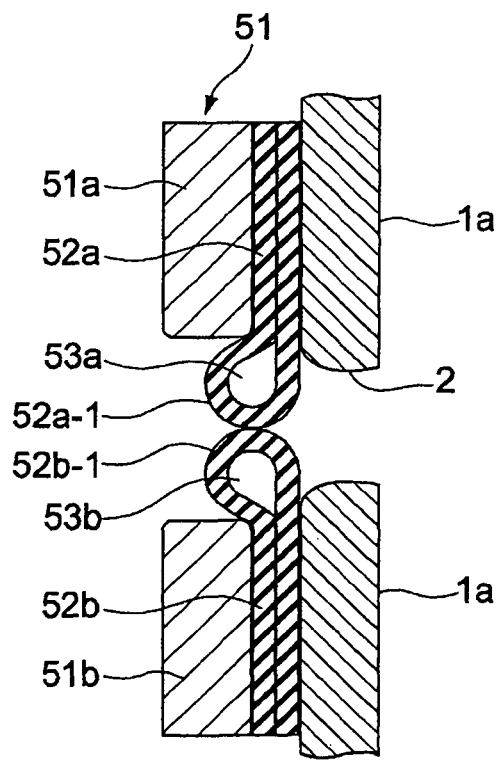
FIG. 28 is a view showing a second modified example of the guide member and the sheet-formed member, in one embodiment of the present invention.

FIG. 28 is a view showing a second modified example of the guide members 51 and the sheet-formed members 52. While the sheet-formed members 52a and 52b have been adhered to both surfaces of the guide members 51a and 51b in the above-described embodiment, a configuration as shown in the figure may be adopted in which one of the principal surfaces of the sheet-formed members 52a and 52b is adhered to the guide members 51a and 51b, and the other is adhered so as to form deflected parts 52a-1 and 52b-1 at end parts.

In this case, the sheet-formed members 52a and 52b are so provided as to be each sandwiched between the guide member 51a, 51b and the front panel 1a. Besides, the voids 53a and 53b are so formed as to be surrounded by the adhered other one of the principal surfaces of the sheet-formed members 52a and 52b. Since the deflected parts 52a-1 and 52b-1 can be easily formed by only adhering the sheet-formed members 52a and 52b in the manner of folding back, the operating efficiency in manufacturing can be enhanced.

Figure 29:
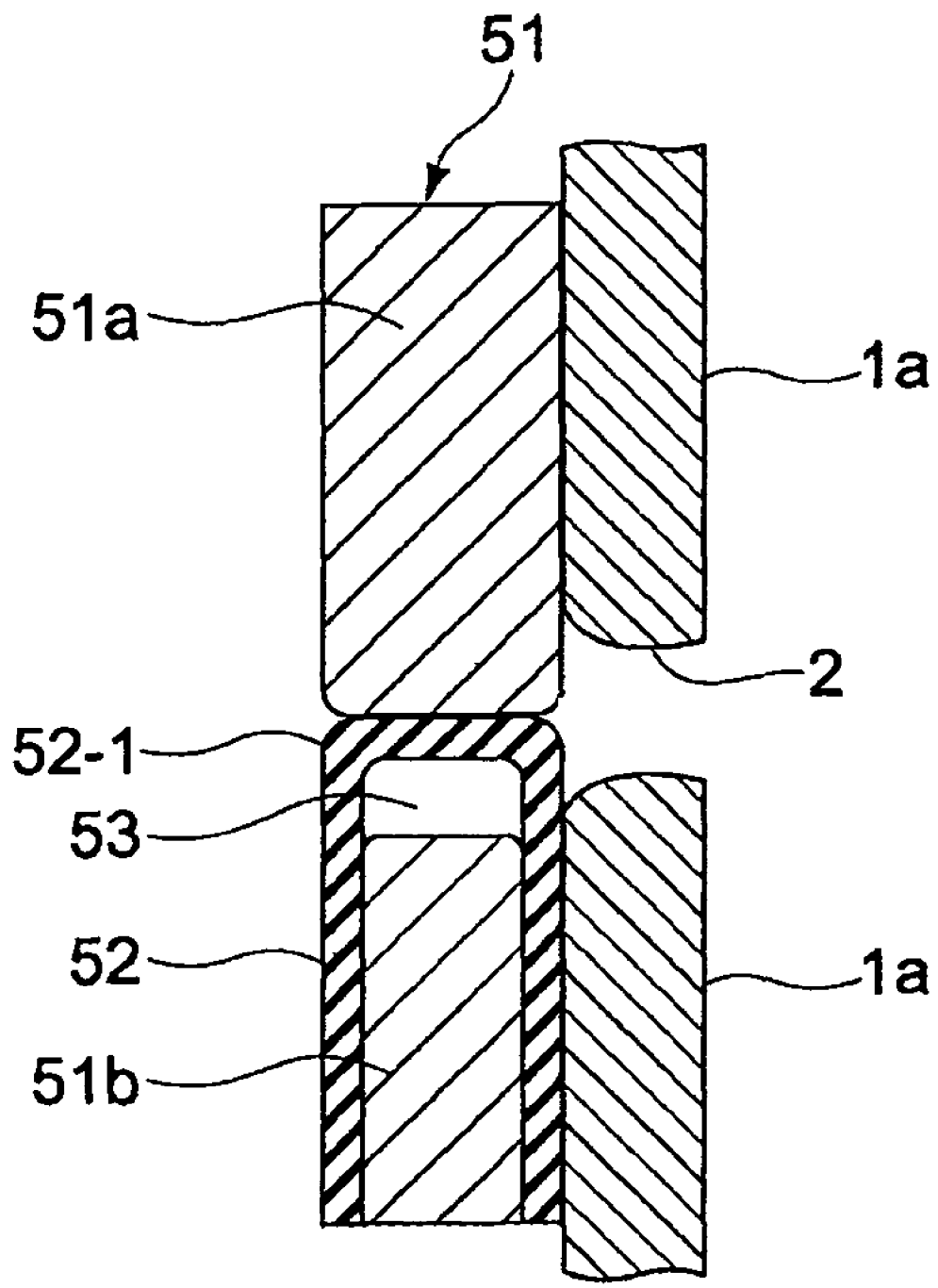
FIG. 29 is a view showing a third modified example of the guide member and the sheet-formed member, in one embodiment of the present invention.

FIG. 29 is a view showing a third embodiment of the guide members 51 and the sheet-formed member 52. While the sheet-formed members 52 have been provided respectively for the guide members 51a and 51b in the above-described embodiment, a configuration as shown in the figure may be adopted in which the sheet-formed member 52 is provided for only the guide member 51b on one side.

In this case, for example, the guide member 51a is formed to be thicker than the guide member 51b. Besides, in the condition where the optical disk 10 is not being inserted or discharged, an end part of the guide member 51a and the deflected part 52-1 of the sheet-formed member 52 make contact with each other, whereas when the optical disk 10 is being inserted or discharged, the recording surface 10-2 of the optical disk 10 and the deflected part 52-1 make contact with each other, whereas the opposite surface 10-1 opposite to the recording surface 10-2 and an end part of the guide member 51a make contact with each other. With this configuration, dust-proofness can be maintained by providing the sheet-formed member 52 only for the guide member 51b on one side, so that the number of component parts and cost can be reduced, as compared with the case where the sheet-formed members 52 are provided respectively for the two guide members 51a and 51b.

Besides, the above-mentioned sheet-formed member 52 may be provided directly on both surfaces or one surface of the slot 2 (the front panel 1a), without the guide member 51 therebetween.

Figure 30:
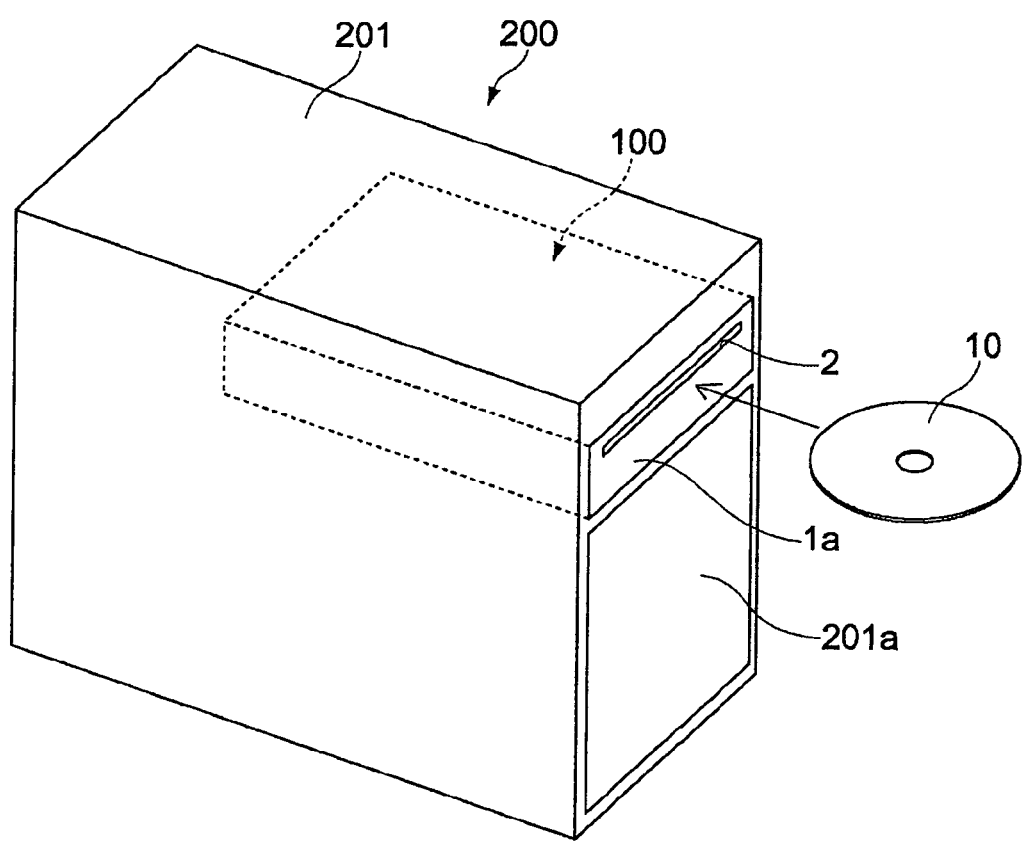
FIG. 30 is a view showing a PC in which the disk in one embodiment of the present invention is mounted.

The disk drive system 100 described in the embodiment above is mounted in an electronic apparatus such as, for example, a PC. FIG. 30 is a view showing a PC 200 in which the disk drive system 100 is mounted. The PC 200 has a casing 201 for holding the disk drive system 100. The disk drive system 100 is so provided that the front panel 1a and the slot 2 thereof are exposed from a front panel 201a of the casing 201. This ensures that the optical disk 10 can be inserted from the front panel 201a side of the casing 201.

Incidentally, the disk drive system 100 can be mounted not only in a PC but also in any of various electronic apparatuses such as audio/visual apparatus, game apparatus, car navigation apparatus, robot apparatus, etc.

It should be understood by those skilled in the art that various modifications, combinations, sub-combinations and alterations may occur depending on design requirements and other factors insofar as they are within the scope of the appended claims or the equivalents thereof.

What is claimed is:

1. A disk drive system comprising:
   a casing having a slot through which to insert and discharge a disk-formed recording medium;
   a mounting part which is provided in said casing and to which said recording medium inserted is mounted for rotating said recording medium;
   a first support part which is provided in said casing in the vicinity of said slot and which is movable in a first direction in a plane substantially parallel to a principal surface of said recording medium while supporting a peripheral edge part of said recording medium being inserted and discharged;
   a second support part which is provided in said casing in the vicinity of said slot so as to face said first support part and which is movable in a second direction opposite to said first direction while supporting a peripheral edge part of said recording medium;
   a rotation drive mechanism which is provided in said casing and by which at least one of said first and second support parts can be rotated around an axis substantially orthogonal to said principal surface so as to convey said recording medium between said slot and said mounting part a first arm which is connected to said first support part at one end thereof and which is turnable in a third direction in said substantially parallel plane around a shaft provided at the other end thereof; and
   a second arm which is connected to said second support part at one end thereof and which is turnable in a fourth direction opposite to said third direction around a shaft provided at the other end thereof in conjunction with said first arm; wherein
   said recording medium is a first recording medium having a first diameter or a second recording medium having a second diameter smaller than said first diameter;
   said first support part includes
   a third support part capable of supporting said first recording medium, and
   a fourth support part provided on said mounting part side relative to said third support part, connected to said first arm in an articulated manner and capable of supporting said first and second recording media;

said second support part includes
a fifth support part capable of supporting said first recording medium, and
a sixth support part provided on said mounting part side relative to said fifth support part, connected to said second arm in an articulated manner and capable of supporting said first and second recording media; and
said disk drive system further comprises
a first base member holding said third and fourth support parts, and
a second base member holding said fifth and sixth support parts.

2. The disk drive system as set forth in claim 1, wherein said third support part and said fourth support part are so provided as to be rotatable in conjunction with each other; and
said fifth and sixth support parts are so provided as not to be rotatable.

3. The disk drive system as set forth in claim 2, wherein said rotation drive mechanism includes:
a first gear provided at said third support part;
a second gear provided at said fourth support part;
a third gear provided at said first base part and meshed with said first and second gears; and
a motor operative to rotatingly drive said first, second and third gears.

4. The disk drive system as set forth in claim 3, further comprising:
a control unit which is provided in said casing, detects the insertion of said first recording medium before said inserted first recording medium makes contact with said third and fifth support parts, or detects the insertion of said second recording medium before said inserted second recording medium makes contact with said fourth and sixth support parts, and is capable of such a control as to drive said motor on the basis of the result of said detection.

5. The disk drive system as set forth in claim 3, further comprising:
a first control unit capable of such a control as to detect the movement of said fourth or sixth support part to a predetermined first position and to stop the driving of said motor on the basis of said detection, at the time of discharging said first recording medium; and
a second control unit capable of such a control as to detect the movement of said fourth or sixth support part to a predetermined second position and to stop the driving of said motor on the basis of said detection, at the time of discharging said second recording medium.

* * * * *